US012559906B2

(12) United States Patent     (10) Patent No.: US 12,559,906 B2

Tamura et al.     (45) Date of Patent: Feb. 24, 2026

(54) WORK MACHINE CONTROL METHOD, WORK MACHINE CONTROL PROGRAM, WORK MACHINE CONTROL SYSTEM, AND WORK MACHINE

(71) Applicant: Yanmar Holdings Co., Ltd., Osaka (JP)

(72) Inventors: Kazuki Tamura, Fukuoka (JP); Shogo Suzuki, Osaka (JP); Daisuke Kawaguchi, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 0 days.

(21) Appl. No.: 17/985,440

(22) Filed: Nov. 11, 2022

(65) Prior Publication Data

US 2023/0183942 A1     Jun. 15, 2023

(30) Foreign Application Priority Data

| | | |
|---|---|---|
| Nov. 17, 2021 | (JP) | 2021-187058 |
| Nov. 17, 2021 | (JP) | 2021-187059 |
| Nov. 17, 2021 | (JP) | 2021-187060 |

(51) Int. Cl.

| | |
|---|---|
| *G06F 3/048* | (2013.01) |
| *E02F 9/20* | (2006.01) |
| *E02F 9/26* | (2006.01) |
| *G06F 3/0484* | (2022.01) |

(52) U.S. Cl.
CPC .............. *E02F 9/2012* (2013.01); *E02F 9/26* (2013.01); *G06F 3/0484* (2013.01)

(58) Field of Classification Search
CPC .......... E02F 9/2012; E02F 9/23; G06F 3/0484
See application file for complete search history.

(56) References Cited

U.S. PATENT DOCUMENTS

| | | | | |
|---|---|---|---|---|
| 7,367,769 | B2 * | 5/2008 | Ishii | H01L 21/67276 414/217 |
| 10,684,595 | B2 * | 6/2020 | Vaughn | G05B 15/02 |
| 11,414,839 | B2 * | 8/2022 | Shintani | B60K 35/10 |
| 11,747,803 | B2 * | 9/2023 | Granstrom | G05D 1/0033 701/2 |
| 2004/0074563 | A1 * | 4/2004 | MacNeil | A01G 23/095 144/335 |

(Continued)

OTHER PUBLICATIONS

Jun et al., Design of Electronic Control System of Hydraulic Excavator With CAN Bus and , PID Method, 2010, IEEE, 4 pages (Year : 2010).*

*Primary Examiner* — Linh K Pham
(74) *Attorney, Agent, or Firm* — Chris Mizumoto

(57) ABSTRACT

A method of controlling a work machine is a method of controlling the work machine provided with a machine body that moves according to an operation device operation and that is capable of changing an operation pattern which is a correspondence between the operation device operation and the machine body movement. The control method has presenting the operation pattern information, which shows the current operation pattern, at the time of switching from a state in which the machine body fails to move according to the operation device operation to a state in which the machine body moves according to the operation device operation.

24 Claims, 15 Drawing Sheets

(56) References Cited

U.S. PATENT DOCUMENTS

| | | | |
|---|---|---|---|
| 2004/0092069 A1* | 5/2004 | Ishii | H01L 21/67276 |
| | | | 438/232 |
| 2008/0303785 A1* | 12/2008 | Yun | G09G 5/006 |
| | | | 345/156 |
| 2011/0113486 A1* | 5/2011 | Hunt | G06F 3/0485 |
| | | | 726/19 |
| 2012/0040319 A1* | 2/2012 | Brackett | G07F 9/0235 |
| | | | 235/375 |
| 2013/0345978 A1* | 12/2013 | Lush | G01C 21/3461 |
| | | | 701/533 |
| 2014/0190046 A1* | 7/2014 | Shibata | E02F 9/264 |
| | | | 701/50 |
| 2015/0066214 A1* | 3/2015 | Vaughn | G05B 15/02 |
| | | | 700/275 |
| 2016/0124626 A1* | 5/2016 | Lee | H04M 1/72403 |
| | | | 715/747 |
| 2019/0048560 A1* | 2/2019 | Misaki | E02F 9/261 |
| 2020/0125220 A1* | 4/2020 | Aizu | H04L 12/12 |
| 2020/0263390 A1* | 8/2020 | Raj | E02F 3/437 |
| 2020/0388261 A1* | 12/2020 | Candelore | G10H 1/0083 |
| 2021/0010235 A1* | 1/2021 | Sasaki | E02F 9/205 |
| 2022/0101451 A1* | 3/2022 | Mingarelli | G06Q 10/06311 |
| 2022/0112685 A1* | 4/2022 | Saiki | E02F 9/267 |
| 2022/0235534 A1* | 7/2022 | Horii | E02F 3/435 |
| 2022/0341127 A1* | 10/2022 | Mortensen | B62D 55/00 |
| 2023/0030108 A1* | 2/2023 | Danguchi | B60R 21/0134 |

* cited by examiner

OPERATION PATTERN

ISO, MADE BY COMPANY XX,
MADE BY COMPANY YY

A

B

C

D

RETURN

DETERMINE

Figure 13:
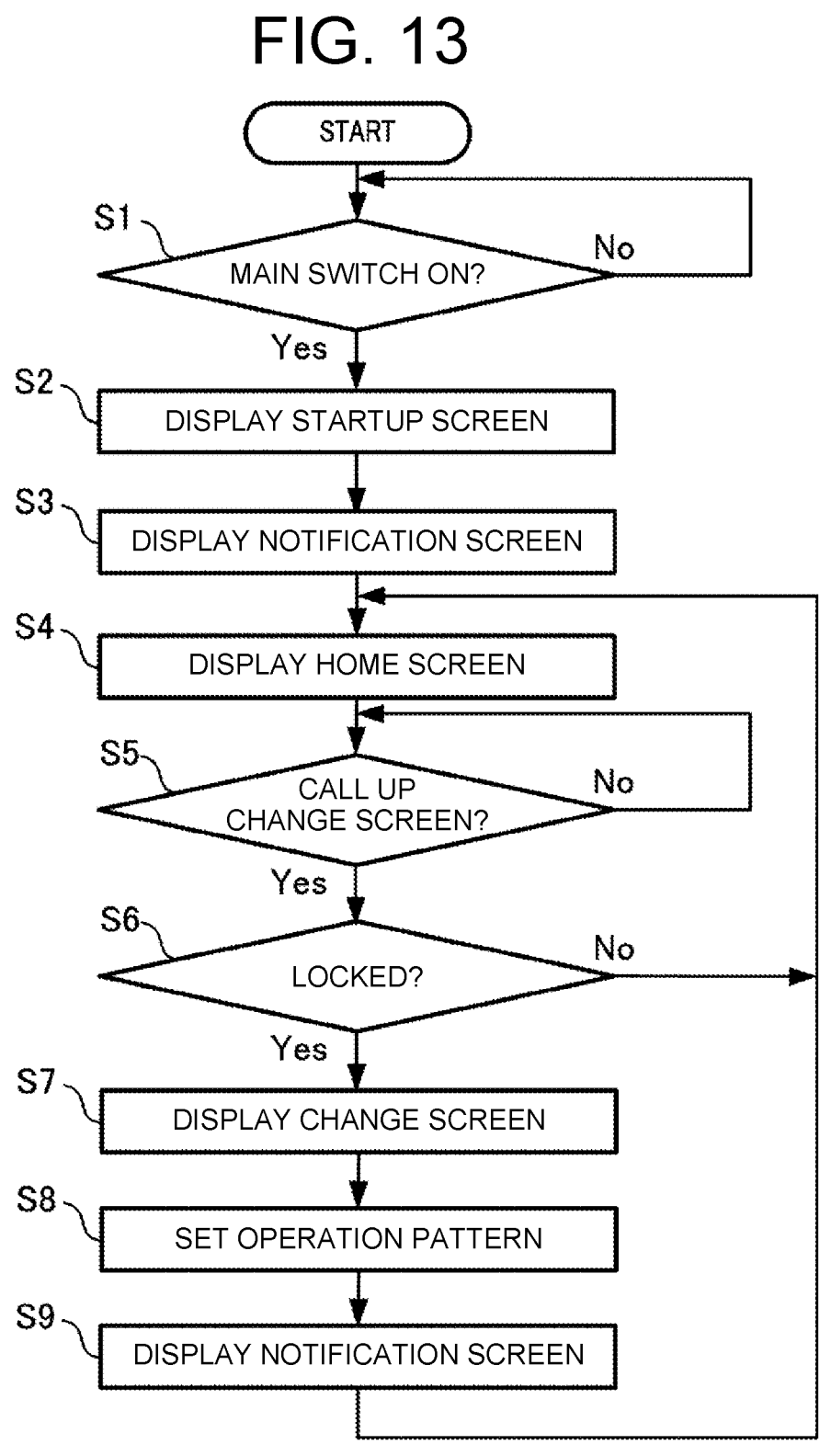

START

S1 MAIN SWITCH ON? — No

Yes

S2 DISPLAY STARTUP SCREEN

S3 DISPLAY NOTIFICATION SCREEN

S4 DISPLAY HOME SCREEN

S5 CALL UP CHANGE SCREEN? — No

Yes

S6 LOCKED? — No

Yes

S7 DISPLAY CHANGE SCREEN

S8 SET OPERATION PATTERN

S9 DISPLAY NOTIFICATION SCREEN

FIG. 15

WORK MACHINE CONTROL METHOD, WORK MACHINE CONTROL PROGRAM, WORK MACHINE CONTROL SYSTEM, AND WORK MACHINE

CROSS-REFERENCE

This application claims foreign priority of JP2021-187058, JP2021-187059, and JP2021-187060, all filed Nov. 17, 2021, the disclosures of which are hereby incorporated by reference in their entirety.

TECHNICAL FIELD

The present invention relates to a work machine control method, a work machine control program, a work machine control system, and a work machine provided with a machine body that moves according to an operation device's operation.

BACKGROUND ART

As a related technology, a hydraulic excavator as a work machine (construction machine) provided with a self-propelled lower travel body, an upper swing unit so installed on the lower travel body as to be swingable via a swing unit, and a work device provided on a front portion of the upper swing unit is known (see, for example, Patent Document 1). The work machine according to the related technology has, as work devices, a boom, an arm, a bucket which are so provided as to be capable of turning up and down, and hydraulic cylinders that drive the above. This work machine is provided with a control valve that supplies and discharges a pressurized oil to and from the swing unit and work device according to an operation lever's operation, and is so configured that an operation pattern (combination pattern), which is a correspondence between the operation lever's operation and the control valve, is switchable the switch lever's operation. That is, operating the switch lever switches the correspondence between an operation direction of the operation device (operation lever) and an operation of each actuator, such as the boom cylinder, the arm cylinder, or the bucket cylinder.

In the above related technology, in an operation pattern checking operation, an operator opens a cab's maintenance door thereby to expose a pattern switch valve. In this state, visually observing a position of the switch lever of the pattern switch valve can check whether or not the operation pattern matches the operator's own preference.

PRIOR ART DOCUMENT

Patent Document

Patent Document 1: Japanese Unexamined Patent Application Publication No. 2020-147968

SUMMARY OF INVENTION

Technical Problem

In the above related technology, the operator checks the operation pattern by visually observing the position of the switch lever; therefore, neglecting this checking operation may cause the machine body (work machine, etc.) to unexpectedly move according to the operation device's operation, thus requiring the operator to make the operation with care.

An object of the present invention is to provide a work machine control method, a work machine control program, a work machine control system, and a work machine that easily reduce a burden on an operator for an operation.

Solution to Problem

A method of controlling a work machine according to one embodiment of the present invention is a method of controlling a work machine provided with a machine body that moves according to an operation device's operation and that is capable of changing an operation pattern which is a correspondence between the operation device's operation and the machine body's movement. The method of controlling has presenting the operation pattern information, which shows the current operation pattern, at the time of switching from a state in which the machine body fails to move according to the operation device's operation to a state in which the machine body moves according to the operation device's operation. Further, a method of controlling a work machine according to one embodiment of the present invention is a method of controlling a work machine provided with a machine body that moves according to an operation device's operation and that is capable of changing an operation pattern which is a correspondence between the operation device's operation and the machine body's movement. The method of controlling has: causing the display device to display a change screen for changing the operation pattern, and causing the display device to display a call up screen for calling up the change screen. The call up screen includes operation pattern information showing the current operation pattern. Further, a method of controlling a work machine according to one embodiment of the present invention is a method of controlling a work machine provided with a machine body that moves according to an operation device's operation and that is capable of changing an operation pattern which is a correspondence between the operation device's operation and the machine body's movement. The method of controlling having: causing a display device to display a home screen including: information on an active state of the work machine and, operation pattern information showing the operation pattern that is current.

A work machine control program according to one embodiment of the present invention is a program that causes one or more processors to execute the method of controlling the work machine.

A work machine control system according to one embodiment of the present invention is used for a work machine provided with a machine body that moves according to an operation device's operation and that is capable of changing an operation pattern which is a correspondence between the operation device's operation and the machine body's movement. The work machine control system is provided with a presentation processing unit.

The presentation processing unit presents the operation pattern information, which shows the current operation pattern, at the time of switching from a state in which the machine body fails to move according to the operation device's operation to a state in which the machine body moves according to the operation device's operation. Further, a work machine control system according to one embodiment of the present invention is used for a work machine provided with a machine body that moves according to an operation device's operation and that is capable of changing an operation pattern which is a correspondence between the operation device's operation and the machine body's movement. The work machine control system is provided with a presentation processing unit. The presentation processing unit causes the display device to display a change screen for changing the operation pattern, and a call up screen for calling up the change screen. The call up screen includes operation pattern information showing the current operation pattern. Further, a work machine control system according to one embodiment of the present invention is used for a work machine provided with a machine body that moves according to an operation device's operation and that is capable of changing an operation pattern which is a correspondence between the operation device's operation and the machine body's movement. The work machine control system is provided with a presentation processing unit. The presentation processing unit causes a display device to display a home screen including: information on an active state of the work machine and, operation pattern information showing the current operation pattern.

A work machine according to one embodiment of the present invention is provided with the work machine control system and the machine body.

Advantageous Effects of Invention

The present invention can provide a work machine's control method, a work machine control program, a work machine control system, and the work machine that easily reduce a burden on an operator for an operation.

BRIEF DESCRIPTION OF DRAWINGS

FIG. 9 is a diagram showing an example of the home screen (camera screen) displayed by the work machine control system according to the first embodiment.

FIG. 10 is a diagram showing an example of a change screen displayed by the work machine control system according to the first embodiment.

FIG. 11 is a conceptual diagram showing a shift state of the display screen displayed by the work machine control system according to the first embodiment.

FIG. 13 is a flowchart showing an operation example of the work machine control system according to the first embodiment.

FIG. 15 is a diagram showing an example of the home screen displayed by the work machine control system according to the second embodiment.

DESCRIPTION OF EMBODIMENTS

Embodiments of the present invention will be described below with reference to the accompanying drawings. The following embodiments are each an embodied example of the present invention, and are not intended to limit the technical scope of the present invention.

First Embodiment

[1] Overall Configuration

Figure 1:
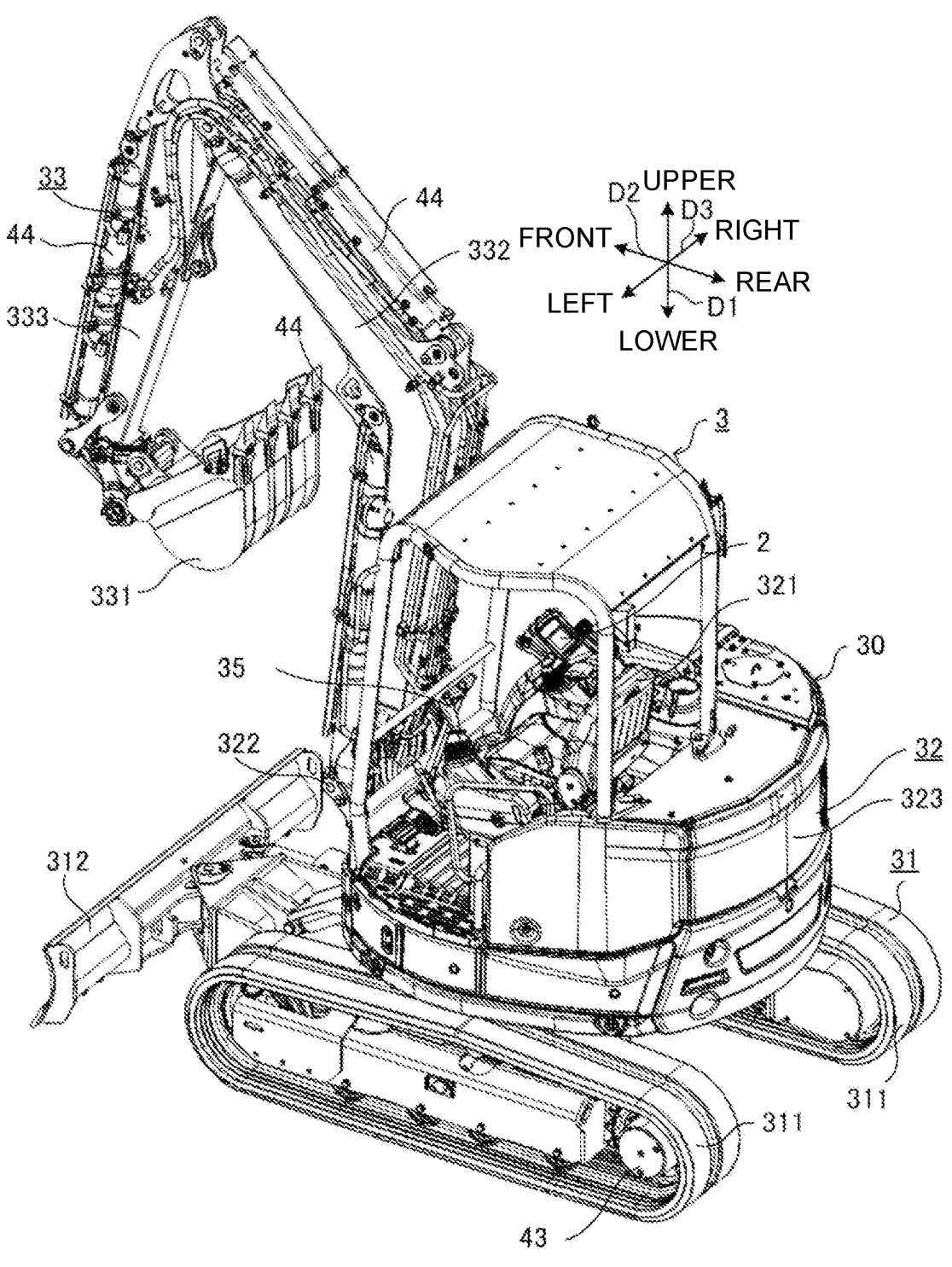
FIG. 1 is a schematic perspective view showing an overall configuration of a work machine according to a first embodiment.
Figure 2:
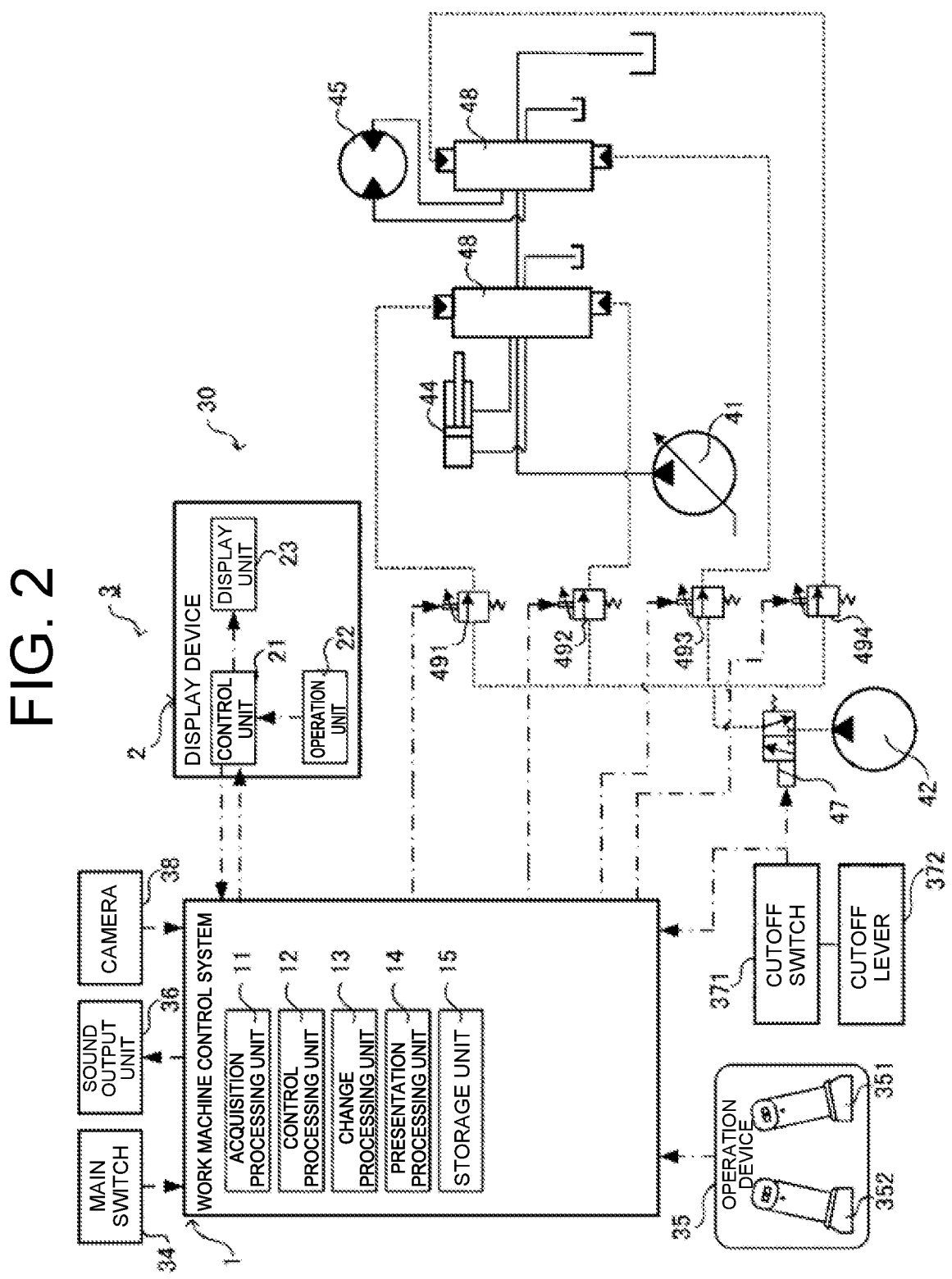
FIG. 2 is a schematic block diagram of the work machine according to the first embodiment.

A work machine 3 according to the present embodiment has a machine body 30 provided with a travel unit 31, a swing unit 32, and a work unit 33, as shown in FIG. 1. The work machine 3 is further provided with a work machine control system 1 (hereinafter, simply referred to as "control system 1"), as shown in FIG. 2. Additionally, as shown in FIGS. 1 and 2, the machine body 30 is further provided with a display device 2, a main switch 34, an operation device 35, a sound output unit 36, a camera 38, a cutoff switch 371, a cutoff lever 372, and the like.

The "work machine" referred to in the present disclosure means a machine for various types of work, examples thereof including work vehicles such as a backhoe (including a hydraulic excavator and a mini excavator), a wheel loader, and a carrier. The work machine 3 is provided with the work unit 33 so configured as to be capable of doing one or more operations.

The work machine 3 is not limited to the "vehicle", but may be, for example, a work vessel, or a flying work body such as a drone or a multi-copter. Further, the work machine 3 is not limited to a construction machine (construction equipment), but may also be an agricultural machine (farm equipment) such as a rice transplanter, a tractor or a combine harvester. According to the present embodiment, unless particularly specified, a case in which the work machine 3 is a riding-type backhoe and can perform excavating, land preparation, trenching, or loading operations as its work will be taken as an example. More in detail, it is assumed that the work machine 3 according to the present embodiment has the swing unit 32, which includes the work unit 33, is of "ultra-small swing type" that can make a full swing within 120% of the full width of the travel unit 31 (the full width of the right and left pairs of crawlers 311), or of "rearward ultra-small swing type" that has a rear end swing radius ratio within 120%.

Further, according to the present embodiment, for convenience of description, a vertical direction in a state in which the work machine 3 is usable is defined as an upper/lower direction D1. Further, a front/rear direction D2 and a right/left direction D3 are each defined based on a direction viewed from a user (operator) riding on (a drive unit 321 of) the work machine 3 in a non-swing state of the swing unit 32. In other words, each of the directions used in the present embodiment is a direction defined based on the machine body 30 of the work machine 3, and a direction in which the machine body 30 moves at the time of the work machine 3 moving forward is referred to as "front", and a direction in which the machine body 30 moves at the time of the work machine 3 moving rearward is referred to as "rear". Similarly, a direction in which a front end portion of the machine body 30 moves at the time of the work machine 3 swinging to the right is referred to as "right," and a direction in which the front end portion of the machine body 30 moves at the time of the work machine 3 swinging to the left is referred to as "left". However, these directions are not intended to limit a use direction (a direction in use) of the work machine 3.

The work machine 3 includes an engine serving as a power source. As an example in the present embodiment, the engine is a diesel engine. The engine is driven by a fuel (in this case, light oil) supplied from a fuel tank. In the work machine 3, the engine drives a hydraulic pump 41 (refer to FIG. 2), for example, and a hydraulic oil is supplied from the hydraulic pump 41 to a hydraulic actuator (including a hydraulic motor 43 and a hydraulic cylinder 44) of each portion of the machine body 30, thereby to drive the machine body 30. The above work machine 3 can be controlled by the user (operator), who is boarding a drive unit 321 of the machine body 30, operating the operation device 35 such as operation levers 351, 352 (see FIG. 2), for example.

In the present embodiment, it is assumed that the work machine 3 is the riding type backhoe as described above; therefore, the work unit 33 is driven according to the operation by the user (operator) riding on the drive unit 321, thereby to do the work such as excavation. The drive unit 321 on which the user rides is provided on the swing unit 32.

Here, the display device 2 and the operation device 35 are installed on the drive unit 321 of the machine body 30; the user can operate the operation device 35 while viewing the work machine 3's various information displayed at the display device 2. As an example, a display screen of the display device 2 displays information on an active state of the work machine 3, such as a cooling water temperature and a hydraulic oil temperature, so that the user can check, at the display device 2, the information that is necessary for operating the operation device 35 and that is on the active state of the work machine 3.

The travel unit 31 has a travel function, and is so configured as to be capable of traveling (including swinging) on the ground. The travel unit 31 includes a pair of right and left crawlers 311 and a blade 312, for example. The travel unit 31 further includes the travel-directed hydraulic motor 43 (hydraulic actuator) for driving the crawler 311.

The swing unit 32 is provided above the travel unit 31, and is so configured as to be swingable, relative to the travel unit 31, about a rotation shaft along the vertical direction. The swing unit 32 has a hydraulic motor 45 (see FIG. 2), and the like as a swing-directed hydraulic actuator. The swing unit 32 includes the engine and the hydraulic pump 41, other than the drive unit 321. At a front end portion of the swing unit 32, there is provided a boom bracket 322 to which the work unit 33 is mounted.

The work unit 33 is so configured as to do one or more operations. The work unit 33 is supported to the boom bracket 322 of the swing unit 32, and does the work. The work unit 33 has a bucket 331. The bucket 331 is a type of attachment (work instrument) that is mounted on the machine body 30 of the work machine 3, and that is composed of an optional instrument selected from among plural types of attachments according to content of the work. The bucket 331, as an example, is removably mounted to the machine body 30, and is replaced according to the content of the work. In addition to the bucket 331, the attachments for the work machine 3 include various instruments, such as a breaker, an auger, a crusher, a fork, a fork claw, a steel cutter, an asphalt cutter, a mower, a ripper, a mulcher, a tilt rotator, and a tamper.

The work unit 33 further has a boom 332, an arm 333, and a hydraulic actuator (including hydraulic cylinder 44, hydraulic motor, and the like), and the like. The bucket 331 is mounted to a tip end of the arm 333.

The boom 332 is rotatably supported by the boom bracket 322 of the swing unit 32. Specifically, the boom 332 is supported by the boom bracket 322 in a manner to rotate about a rotation axis along the horizontal direction. The boom 332 is so shaped as to extend upward from a base end portion supported by the boom bracket 322. The arm 333 is coupled to a tip end of the boom 332. The arm 333 is supported to the boom 332 in a manner to rotate about a rotation axis along the horizontal direction.

The work unit 33 operates under power from the engine as the power source. Specifically, the engine drives the hydraulic pump 41 thereby to supply the hydraulic oil from the hydraulic pump 41 to the hydraulic actuator (such as the hydraulic cylinder 44) of the work unit 33, thereby to operate various positions (the bucket 331, the boom 332, and the arm 333) of the work unit 33.

According to the present embodiment, in particular, the work unit 33 has an articulated configuration in which the boom 332 and the arm 333 are individually rotatable. That is, the boom 332 and the arm 333 each rotate about the rotation axis extending along the horizontal direction, so that the articulated work unit 33 including the boom 332 and the arm 333 is capable of doing operations such as extending and folding as a whole.

Each of the travel unit 31 and the swing unit 32, as well as the work unit 33, is powered by the engine as the power source. That is, the hydraulic oil is supplied from the hydraulic pump 41 to the hydraulic motor 43 of the travel unit 31, the hydraulic motor 45 of the swing unit 32, and the like, thereby to operate the swing unit 32 and the travel unit 31.

The work machine 3 is further provided with a drive unit (mechanism) such as a PTO (power take-off) for supplying power to the bucket 331 (attachment). Specifically, the drive unit sends out, to the bucket 331, the hydraulic oil from the hydraulic pump 41 driven by the engine, and adjusts the flowrate of the hydraulic oil, thereby to adjust the magnitude of the power to be supplied to the bucket 331. Here, the drive unit has plural (four in the present embodiment as an example) PTO ports, that is, output ports (hereinafter, "PTO1", "PTO2", "PTO3", and "PTO4"). The respective PTO1 to PTO4 are individually adjustable for power, i.e., flowrate of the hydraulic oil.

FIG. 2 schematically shows a hydraulic circuit and electric circuit (electric connection) of the work machine 3 according to the present embodiment. In FIG. 2, a solid line shows a high-pressure oil path (for hydraulic oil), a dotted line shows a low-pressure oil path (for pilot oil), and a dashed-dotted line shows an electric signal path.

As shown in FIG. 2, the work machine 3 includes a pilot pump 42, first control valves 491 to 494, a second control valve 47, a direction switch valve (control valve) 48 and the like, in addition to the hydraulic pump 41, the hydraulic cylinder 44, and the hydraulic motor 45. In FIG. 2, only one hydraulic cylinder 44 for driving the boom 332 is shown; however, the same hydraulic circuit is configured also for the hydraulic cylinder 44 for driving the arm 333 or bucket 331, etc. In FIG. 2, only the hydraulic motor 45 of the swing unit 32 is shown, but the same hydraulic circuit is configured also for the hydraulic motor 43 of the travel unit 31.

The hydraulic oil from the hydraulic pump 41 driven by the engine is supplied to the hydraulic motor 43 of the travel unit 31, the hydraulic motor 45 of the swing unit 32, the hydraulic cylinder 44 of the work unit 33, and the like.

This drives the hydraulic actuators such as the hydraulic motors 43, 45, and the hydraulic cylinder 44.

Each of the hydraulic actuators, such as the hydraulic motors 43, 45 and the hydraulic cylinder 44, includes a pilot-type direction switch valve 48 capable of switching a direction and flowrate of the hydraulic oil from the hydraulic pump 41. The direction switch valve 48 is driven when the pilot oil serving as an input instruction is supplied from the pilot pump 42.

Here, a supply path of the pilot oil to each of the direction switch valves 48 is provided with one of the first control valves 491 to 494. The first control valves 491 to 494 are each an electromagnetic control valve (solenoid valve), and are inserted to between the direction switch valve 48 and the pilot pump 42. Each of the first control valves 491 to 494 is connected to the control system 1, and operates according to the control signal (supply current) from the control system 1. Specifically, the control system 1 controls the first control valves 491 to 494 according to the operation of the operation device 35 (operation lever), and directs, for example, the deployment and reduction movements of the work unit 33. Each of the first control valves 491 to 494 is here assumed to be a (solenoid type) proportional control valve, but can be, for example, an open/close valve that can switch between opening and cutting off of the flow path.

The above direction switch valve and first control valve are used not only for the hydraulic cylinder 44 for driving the boom 332 as well as the hydraulic motor 45 of the swing unit 32, but also for a hydraulic circuit of the hydraulic cylinders 44 for driving the arm 333 or the bucket 331, and a hydraulic circuit of the hydraulic motor 43 of the travel unit 31. Therefore, according to the operation device 35's operation, the travel unit 31, the swing unit 32, and the work unit 33 can be moved.

Further, the pilot oil's upstream viewed from the first control valves 491 to 494 is provided with the second control valve 47. The second control valve 47 includes an electromagnetic control valve (solenoid valve), and is inserted to between the pilot pump 42 and a plurality of first control valves 491 to 494. The second control valve 47 is connected via the cutoff switch 371 to the power supply, and operates according to the current supplied from the power source. Here, the second control valve 47 opens the flow path of the pilot oil in an energized state, i.e., in a state of a current as the control signal being supplied, and cuts off the flow path of the pilot oil in a de-energized state, i.e., in a state of the current as the control signal being cut off. Therefore, cutting off of the supply current to the second control valve 47 makes the hydraulic actuator (such as hydraulic cylinder 44) disabled, thus forcibly stopping the hydraulic actuator, regardless of the operation device 35's operation.

The cutoff switch 371 is linked to the cutoff lever 372. The cutoff lever 372 is placed in the drive unit 321 of the machine body 30, and accepts an operation input by the user (operator). As an example in the present embodiment, the cutoff lever 372 can be operated along the upper/lower direction D1. When the cutoff lever 372 is in the "up position" which is an upper end position in a movable range, the cutoff switch 371 is "off"; when the cutoff lever 372 is in the "down position" which is a lower end position in the movable range, the cutoff switch 371 is "on". Then, the cutoff switch 371 is connected to the control system 1, and the cutoff switch 371's on or off is monitored by the control system 1.

Therefore, when the cutoff lever 372 is in the "down position", the second control valve 47 is brought in the energized state, thus driving the hydraulic actuator (hydraulic cylinder 44 and the like) by the operation device 35's operation. In contrast, when the cutoff lever 372 is in the "up position", the second control valve 47 is brought in the de-energized state, thus forcibly stopping the hydraulic actuator regardless of the operation device 35's operation. Therefore, so as to drive the hydraulic actuator (such as hydraulic cylinder 44), the user (operator) needs to operate the cutoff lever 372 to the "down position".

Further, each of the swing unit 32 and the travel unit 31 is also moved with the hydraulic oil supplied from the hydraulic pump 41 to the hydraulic actuator (hydraulic motors 43, 45, and the like); therefore, the cutoff lever 372 being in the "up position" makes the swing unit 32 and travel unit 31 disabled. That is, when the cutoff lever 372 is in the "up position", the work unit 33, the swing unit 32, and the travel unit 31 are all forcibly disabled.

In short, the cutoff switch 371, when being off, is in a "locked state" in which the work machine 3's movement is restricted (including prohibition), and when being on, is in an "unlocked state" in which the work machine 3's movement is not restricted. Then, the cutoff lever 372 being in the "up position" and the cutoff switch 371 being in the locked state (off) forcibly restrict the work machine 3's movement regardless of the operation device 35's operation. The cutoff lever 372 is the lever operated so as to lock the work machine 3's movement in the above manner, and is synonymous with a gate lock lever.

The main switch 34 is placed in the drive unit 321 of the machine body 30, and is operated by the user (operator) at the time of the work machine 3's startup. While the main switch 34 is turned off, the machine body 30 (including the travel unit 31, swing unit 32, and work unit 33) is not in a state of moving according to the operation device 35's operation; only when the main switch 34 is turned on, the machine body 30 becomes movable according to the operation device 35's operation. Further, turning on the main switch 34 also starts energizing the display device 2 and the like. As an example in the present embodiment, the main switch 34 is linked to a key cylinder, and is turned on when the engine is started (ignition turned on) by using the key.

The operation device 35 is placed at the drive unit 321 of the machine body 30, and is a user interface for accepting the operation input by the user (operator). In the present embodiment, the operation device 35 is an electric operation device 35, and outputs, to the control system 1, an electric signal (operation signals) that accords to the user's operation, thereby to accept various operations by the user. As an example in the present embodiment, the operation device 35 includes a pair of the operation levers 351, 352 (see FIG. 2). The operation lever 351 is placed on the right hand side as viewed from the user (operator) boarding the drive unit 321, and the operation lever 352 is placed on the left hand side as viewed from the user boarding the drive unit 321. Therefore, the user holds the operation lever 351 with the right hand and the operation lever 352 with the left hand, for example, and separately operates the pair of operation levers 351, 352 to thereby cause the work machine 3 to do various movements.

The operation levers 351 and 352 are stick-type actuators, respectively, and are operated to tilt to any of "front", "rear", "left", and "right", for example, thereby to output the electric signal (operation signal) that accords to the operation. The operation device 35, as an example, outputs different operation signals that respectively correspond to an operation to tilt the operation lever 351 to the front, an operation to tilt the operation lever 351 to the right, an operation to tilt the operation lever 352 to the front, and an operation to tilt the operation lever 352 to the right.

The sound output unit 36 outputs a sound (including voice) to the user (operator). The sound output unit 36 includes a buzzer or a speaker, and outputs the sound upon receiving the electric signal. The sound output unit 36 is connected to the control system 1, and outputs the sound, such as a beep or a voice, according to a sound control signal from the control system 1. In the present embodiment, the sound output unit 36, as well as the display device 2, is placed in the drive unit 321 of the machine body 30. The sound output unit 36 may be placed integrally with the display device 2.

The camera 38 has the function of capturing a peripheral image of the machine body 30. The camera 38 is installed at the swing unit 32, for example, and is so configured to be capable of capturing the image around the machine body 30 (in at least one of front, rear, left, right, upper, and lower). The image captured by the camera 38 may be any of black-and-white, infrared, and full color, and may be any of still and moving. As an example in the present embodiment, the camera 38 captures the image behind the machine body 30 (peripheral image) as a full-color moving image, and the image data of the peripheral image is output in real time to the control system 1.

The control system 1 is mainly composed of a computer system having one or more processors such as a CPU (Central Processing Unit), and one or more storages such as a ROM (Read Only Memory) and a RAM (Random Access Memory), executing various processes (information processes). According to the present embodiment, the control system 1 is an integrated controller that controls the overall work machine 3, and includes, for example, an ECU (Electronic Control Unit). However, the control system 1 may be provided separate from the integrated control unit, and may be primarily composed of one processor or a plurality of processors. The control system 1 will be described in detail in the column "[2] Configuration of Control System".

The display device 2 is placed at the drive unit 321 of the machine body 30, and is a user interface for accepting the operation input by the user (the operator) and thereby for outputting various types of information to the user. The display device 2 outputs the electric signal that accords to the operation by the user, for example, thereby to accept various operations by the user. With this, the user (operator) can view a display screen Dp1 (refer to FIG. 3) displayed at the display device 2, and also can operate the display device 2 as necessary.

As shown in FIG. 2, the display device 2 includes a control unit 21, an operation unit 22, and a display unit 23. The display device 2 is so configured as to be communicable with the control system 1, and can execute sending and receiving of data to and from the control system 1. As an example in the present embodiment, the display device 2 is a dedicated device used for the work machine 3.

The control unit 21 controls the display device 2 according to the data from the control system 1. Specifically, the control unit 21 outputs the electric signal that accords to the user's operation accepted by the operation unit 22, and displays, at the display unit 23, the display screen Dp1 generated by the control system 1.

Figure 3:
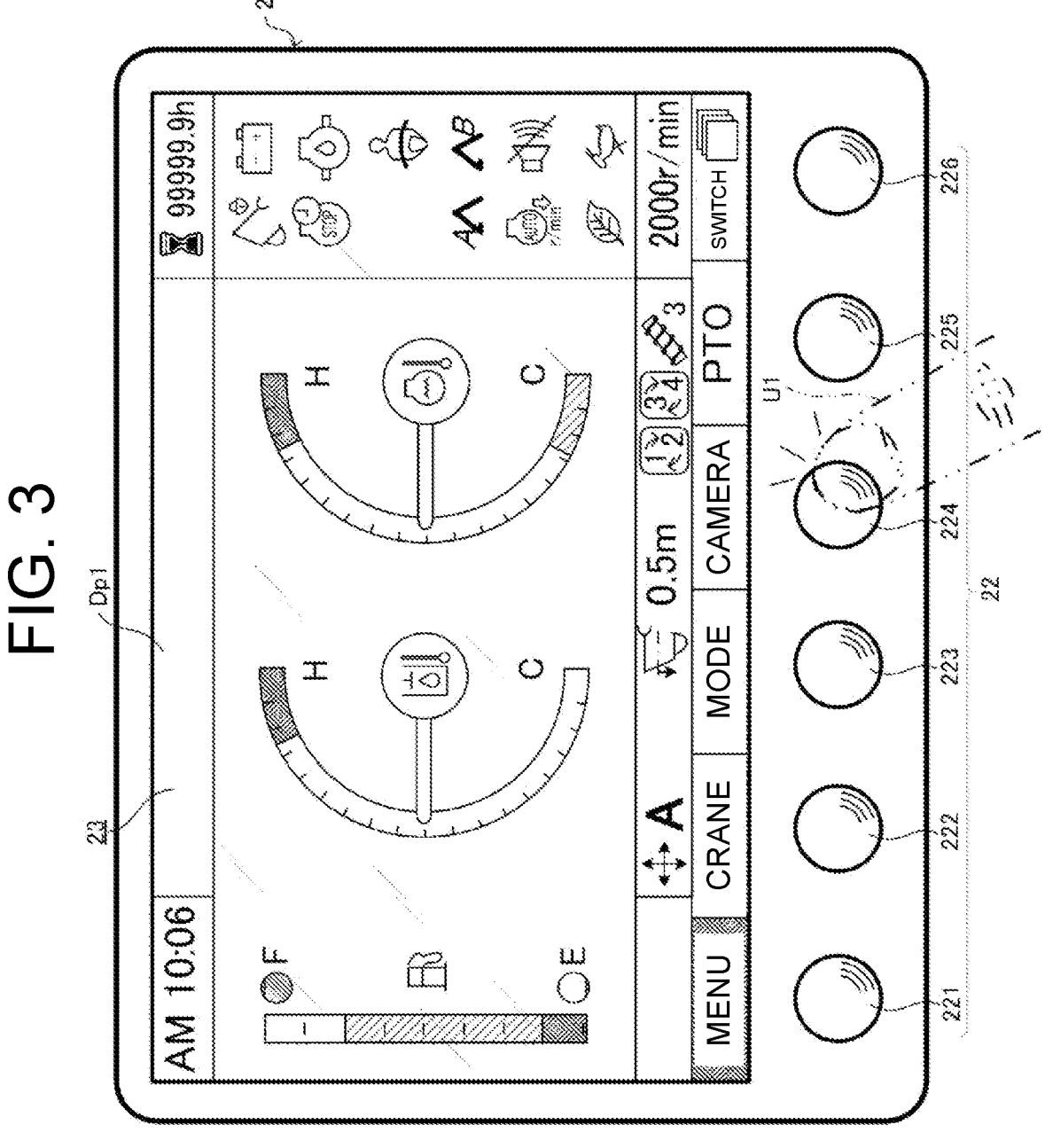
FIG. 3 is a schematic external view of a display device of the work machine according to the first embodiment.

The operation unit 22 is a user interface for accepting the user (operator)'s operation input to the display screen Dp1 displayed at the display unit 23. The operation unit 22 outputs the electric signal that accords to a user U1 (refer to FIG. 3)'s operation, for example, thereby to accept various operations by the user U1. As an example in the present embodiment, the operation unit 22 includes a plurality (herein six) of mechanical push button switches 221 to 226, as shown in FIG. 3. Along a peripheral edge of a display region of the display unit 23, the plurality of push button switches 221 to 226 is placed in the vicinity of the display region (a lower portion in the example in FIG. 3). The plural push button switches 221 to 226 are associated with after-described items displayed on the display screen Dp1; operating any of the push button switches 221 to 226 operates (selects) any of the items on the display screen Dp1.

Further, the operation unit 22 may include a touch screen and an operation dial. In this case as well, operating the operation unit 22 operates (selects) any of the items on the display screen Dp1.

The display unit 23 is a user interface, which is for presenting information to the user U1 (the operator), such as a liquid crystal display or organic EL display that displays various types of information. By displaying, the display unit 23 presents various types of information to the user. As an example in the present embodiment, the display unit 23 is a full-color liquid crystal display with a backlight, and has a display region that is long in a transverse direction, as shown in FIG. 3.

The machine body 30 is further provided with a communication terminal, a fuel tank, a battery, and the like, in addition to the above configuration. Further, the machine body 30 is provided with various sensors (including camera) for detecting a to-be-detected object in a monitor area around the work machine 3, examples of sensors including a camera for capturing an image around the machine body 30.

[2] Configuration of Control System

Next, a configuration of the control system 1 according to the present embodiment will be described with reference to FIG. 2. The control system 1 controls various portions of the machine body 30 (including travel unit 31, swing unit 32, work unit 33, etc.), according to the operation on the operation device 35. In the present embodiment, the operation device 35 is installed on the machine body 30 of the work machine 3, as described above. The control system 1 is a component of the work machine 3, and included in the work machine 3 together with the machine body 30 and the like. In other words, the work machine 3 according to the present embodiment is provided with at least the control system 1 and the machine body 30.

As shown in FIG. 2, the control system 1 is provided with an acquisition processing unit 11, a control processing unit 12, a change processing unit 13, a presentation processing unit 14, and a storage unit 15. As an example in the present embodiment, the control system 1 is mainly composed of a computer system having one or more processors; therefore the one or more processors, by executing a work machine control program, realize the above plural functional units (acquisition processing unit 11 and the like). The plurality of functional units included in the control system 1 may be distributed to a plurality of cases, or may be included in a single case.

The control system 1 is so configured as to be communicable with a device provided in each unit of the machine body 30. That is, to the control system 1, at least the display device 2, the main switch 34, the operation device 35, the sound output unit 36, the first control valves 491 to 494, the cutoff switch 371, and the like are connected. This allows the control system 1 to control the display device 2, the sound output unit 36, the first control valves 491 to 494, etc., and to acquire electric signals (operation signals, etc.) from the display device 2, the main switch 34, the operation device 35, and the cutoff switch 371. Being "communicable" referred to in the present disclosure means that information (data) can be sent and received either directly by a proper communication method of a wired communication or wireless communication (communication using a radio wave or light as a medium), or indirectly via a communication network (a network), a relay or the like. Therefore, the control system 1 may send and receive various types of information (data) directly to and from each device, or indirectly via the relay or the like. The control system 1 can communicate with the device provided at each portion of the machine body 30, by using, as an example, a communication method such as a Controller Area Network (CAN) or the like.

The acquisition processing unit 11 executes an acquiring process that accepts the operation that is for controlling the work machine 3 and that is on the operation device 35. That is, the operation device 35 having a pair of operation levers 351, 352 outputs an operation signal that accords to the operation by the user, thereby causing the acquisition processing unit 11 to acquire the above operation signal. With this, the acquisition processing unit 11 can acquire the operation signal that shows operation contents (operation direction and operation amount) of the operation levers 351, 352, such as an operation to tilt forward the right operation lever 351, or an operation to tilt forward the left operation lever 352, etc. Further, the acquisition processing unit 11 is so configured as to acquire the ON/OFF of each of the main switch 34 and the cutoff switch 371.

The control processing unit 12 executes a control process that controls the machine body 30 according to the operation device 35's operation. In the control process, the control processing unit 12 controls the travel unit 31, swing unit 32, and work unit 33, etc. of the machine body 30. Specifically, the control processing unit 12, according to the operation device 35's operation acquired by the acquisition processing unit 11, outputs control signals to the first control valves 491 to 494, thereby to control the hydraulic actuators such as the hydraulic motors 43, 45, and the hydraulic cylinder 44.

Here, the control processing unit 12 executes the control process, according to the operation pattern. The "operation pattern" referred to in the present disclosure means a correspondence between the operation device 35's operation and the machine body 30's movement, and includes data, etc. showing a combination of the operation device 35's operation and the machine body 30's movement. That is, according to the correspondence that is defined as the operation pattern and that is between the operation device 35's operation and the machine body 30's movement, the control processing unit 12 realizes the machine body 30's movement that accords to the operation device 35's operation.

For example, in a certain operation pattern, an operation of tilting forward the right operation lever 351 in the operation device 35 is associated with a movement of lowering the boom 332 in the machine body 30, and an operation of tilting rearward the left operation lever 352 in the operation device 35 is associated with a movement of bending the arm 333 in the machine body 30. In this case, when the acquisition processing unit 11 accepts the operation to tilt forward the operation lever 351, the control processing unit 12 controls the first control valves 491 to 494 thereby to so drive the hydraulic cylinder 44 of the work unit 33 as to lower the boom 332. Similarly, when the acquisition processing unit 11 accepts the operation to tilt rearward the operation lever 352, the control processing unit 12 controls the first control valves 491 to 494 thereby to so drive the hydraulic cylinder 44 of the work unit 33 as to bend the arm 333.

The change processing unit 13 executes a changing process that changes the operation pattern. That is, the operation pattern used at the control processing unit 12 is not fixed, but can be optionally changed at the change processing unit 13. As an example in the present embodiment, a plurality of operation pattern is preliminarily stored in the storage unit 15 of the control system 1, and the change processing unit 13 selects, as a "current operation pattern, one operation pattern from among the plural operation patterns. Thus, the change processing unit 13 selects one operation pattern from among the predetermined plural operation patterns, thereby to set the "current operation pattern". Therefore, the operation pattern selected by the change processing unit 13 is switched within the plural operation patterns, thereby to switch the "current operation pattern". Following the operation pattern (current operation pattern) set at the change processing unit 13, the control processing unit 12 executes the control process that controls the machine body 30 according to the operation device 35's operation.

As an example; when the storage unit 15 stores four including the first pattern, second pattern, third pattern, and fourth pattern, as operation patterns, the change processing unit 13 selects any of these first, second, third, and fourth patterns as the "current operation pattern. The first pattern, second pattern, third pattern, and fourth pattern are data that show correspondences (combinations) between the operation device 35's operation and the machine body 30's movement, which correspondences are different from each other. For example, when the change processing unit 13 selects the first pattern as the operation pattern, the control processing unit 12 executes the control process according to the first pattern. Meanwhile, when the change processing unit 13 selects the third pattern as the operation pattern, the control processing unit 12 executes the control process according to the third pattern.

The presentation processing unit 14 executes a presentation process to present operation pattern information showing the current operation pattern. The "current operation pattern" referred to here is the operation pattern that is set at the change processing unit 13, and that is used for the control process at the control processing unit 12. That is, when the first pattern is selected as the operation pattern at the change processing unit 13, for example, the presentation processing unit 14 presents the operation pattern information showing the first pattern. Meanwhile, when the third pattern is selected as the operation pattern at the change processing unit 13, the presentation processing unit 14 presents the operation pattern information showing the third pattern.

The "presentation" as referred to in the present disclosure means to present information to the user (operator) by various measures, including, for example, display (including lighting of display light), sound (including voice), print, sending to another terminal or writing in a non-transient recording medium, or a combination thereof. As an example in the present embodiment, the presentation processing unit 14 causes the display unit 23 of the display device 2 to display the operation pattern information, thereby to present the operation pattern information.

The storage unit 15 includes a nonvolatile storage device such as an HDD (Hard Disk Drive) or SSD (Solid State Drive) which memorizes various information.

A program such as a work machine control program is stored (memorized) in the storage unit 15. The work machine control program, for example, is provided by being recorded on a computer-readable non-transitory recording medium, is read from the non-transitory recording medium by a reading unit of the control system 1, and is stored in the storage unit 15. The work machine control program may be stored in the storage unit 15 by being provided (downloaded) from a server or the like via a telecommunication line to the control system 1.

Further, the storage unit 15 stores plural operation patterns (as an example, first pattern, second pattern, third pattern, and fourth pattern), etc. that are candidates for the "current operation pattern" set at the change processing unit 13. Further, the storage unit 15 stores the "current operation pattern" that is set (selected) at the change processing unit 13.

[3] Method of Controlling Work Machine

Hereinafter, an example of a method of controlling the work machine 3 (hereinafter, simply referred to as a "control method") executed mainly by the control system 1 will be described with reference to FIG. 4 to FIG. 13.

The control method according to the present embodiment is executed by the control system 1 mainly composed of the computer system, and therefore, in other words, is embodied by a work machine control program (hereinafter, simply referred to as "control program"). That is, the control program according to the present embodiment is a computer program that causes one or more processors to execute the control method. The above control program may be cooperatively executed by, for example, the control system 1 and the display device 2.

Here, the control method according to the present embodiment is a method of controlling the work machine 3 that is provided with the machine body 30 that moves according to the operation device 35's operation, and that is capable of changing the operation pattern which is the correspondence between the operation device 35's operation and the machine body 30's movement. In other words, the control system 1 of the present embodiment is used for the work machine 3 that is provided with the machine body 30 that moves according to the operation device 35's operation, and that is capable of changing the operation pattern which is the correspondence between the operation device 35's operation and the machine body 30's movement. That is, in the present embodiment, the control processing unit 12 of the control system 1 executes the control process that controls the machine body 30 according to the operation device 35's operation, thereby to cause the machine body 30 to move according to the operation device 35's operation. Further, the change processing unit 13 of the control system 1 executes the changing process that changes the operation pattern, thereby making it possible to change the operation pattern which is the correspondence between the operation device 35's operation and the machine body 30's operation. Thus, the work machine 3 to be controlled by the control method and control system 1 according to the present embodiment is the work machine 3 that is capable of changing the operation pattern which is the correspondence between the operation device 35's operation and the machine body 30's movement.

Figure 4:
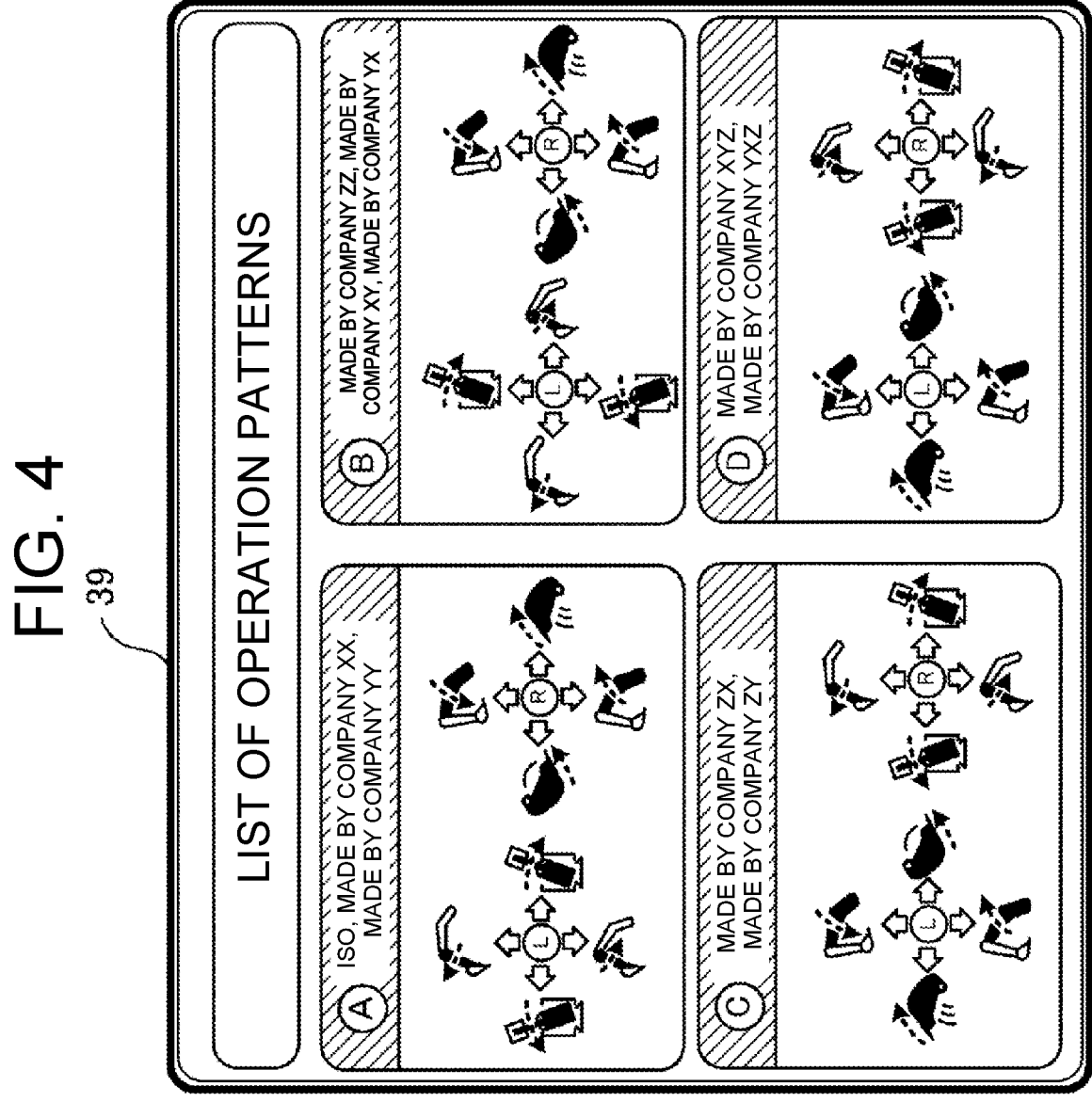
FIG. 4 is a schematic external view of a name plate of the work machine according to the first embodiment.

As an example in the present embodiment, four including a pattern A, a pattern B, a pattern C, and a pattern D are stored in storage unit 15, and the change processing unit 13 selects (sets) any operation pattern from among these four patterns. Then, these four patterns are noted on a name plate 39 attached to the machine body 30, as shown in FIG. 4. The name plate 39 is placed at the drive unit 321, for example, in a manner to be easily visible to the operator boarding the drive unit 321. In the example in FIG. 4, the name plate 39 notes, as the pattern "A", an operation pattern for "ISO, made by company XX, made by company YY", as the pattern "B", an operation pattern for "made by company ZZ, made by company XY, made by company YX", as the pattern "C", an operation pattern for "made by company ZX, made by company YZ", and, as the pattern "D", an operation pattern for "made by company XYZ, made by company YXZ".

Further, the name plate 39 notes, for each of the pattern A, the pattern B, the pattern C, and the pattern D, a graphic image (icon) showing a combination of the operation direction of each of the pair of operation levers 351, 352 with the machine body 30's movement.

For example, in the pattern "A", an operation to tilt forward the right operation lever 351 is associated with the movement to lower the boom 332 at the machine body 30, an operation to tilt rearward the operation lever 351 is associated with the movement to up the boom 332 at the machine body 30, an operation to tilt rightward the operation lever 351 is associated with the movement to open the bucket 331 at the machine body 30, and an operation to tilt leftward the operation lever 351 is associated with the movement to close the bucket 331 (excavate) at the machine body 30. Further, in the pattern "A", an operation to tilt forward the left operation lever 352 is associated with the movement to extend the arm 333 at the machine body 30, an operation to tilt rearward the operation lever 352 is associated with the movement to bend the arm 333 at the machine body 30, an operation to tilt rightward the operation lever 352 is associated with the movement to swing rightward the swing unit 32 at the machine body 30, and an operation to tilt leftward the operation lever 352 is associated with the movement to swing leftward the swing unit 32 at the machine body 30.

Meanwhile, in the pattern "B", an operation to tilt forward the left operation lever 352 is associated with the movement to swing rightward the swing unit 32 at the machine body 30, an operation to tilt rearward the operation lever 352 is associated with the movement to swing leftward the swing unit 32 at the machine body 30, an operation to tilt rightward the operation lever 352 is associated with the movement to bend the arm 333 at the machine body 30, and an operation to tilt leftward the operation lever 352 is associated with the movement to extend the arm 333 at the machine body 30.

Thus, since the operation device 35's operation differs depending on the selected operation pattern, the operation pattern noted at the name plate 39 allows the operator to operate the operation device 35 while checking the operation pattern.

Further, the work machine 3 to be controlled by the control method and control system 1 according to the present embodiment is so configured as to be switchable from a state in which the machine body 30 fails to move according to operation device 35's operation to a state in which the machine body 30 moves according to operation device 35's operation. That is, the work machine 3 may have a situation in which, instead of the machine body 30's ordinarily moving according to the operation device 35's operation, the machine body 30 fails to move according to the operation device 35's operation. In the following, the state in which the machine body 30 fails to move according to the operation device 35's operation is referred to as an "inactive state", and the state in which the machine body 30 moves according to the operation device 35's operation is referred to as an "active state". Examples of the inactive state include when the main switch 34 is off, a startup period immediately after the main switch 34 being switched from off to on, and when the cutoff lever 372 is in the "up" position, etc. Meanwhile, examples of the active state include after an elapse of the startup period after the main switch 34 being switched from off to on, and when the cutoff lever 372 is in the "down" position. In short, switching the main switch 34 from off to on, for example, switches the work machine 3 from the "inactive state" in which the machine body 30 fails to move according to the operation device 35's operation to the "active state" in which the machine body 30 moves according to the operation device 35's operation.

Here, when a preliminarily set specific starting operation for causing the control program to be executed is performed, the control system 1 executes the following various types of processes related to the control method. The starting operation is, for example, a starting operation of the engine of the work machine 3, i.e., an ON operation and the like of the main switch 34. Meanwhile, when a preliminarily set specific ending operation is performed, the control system 1 ends the various types of processes related to the control method. The ending operation is, for example, an operation to stop the engine of the work machine 3, i.e., an OFF operation and the like of the main switch 34.

[3.1] Home Screen

Herein, first, a configuration of the display screen Dp1 displayed on the display unit 23 of the display device 2 by the control method according to the present embodiment will be described. In the drawings showing the display screen Dp1 displayed on the display unit 23 of the display device 2, such as FIG. 5, a dashed-dotted line, a leading line, and a reference sign representing regions are each merely for an illustrative purpose and may not be actually displayed at the display device 2.

Figure 5:
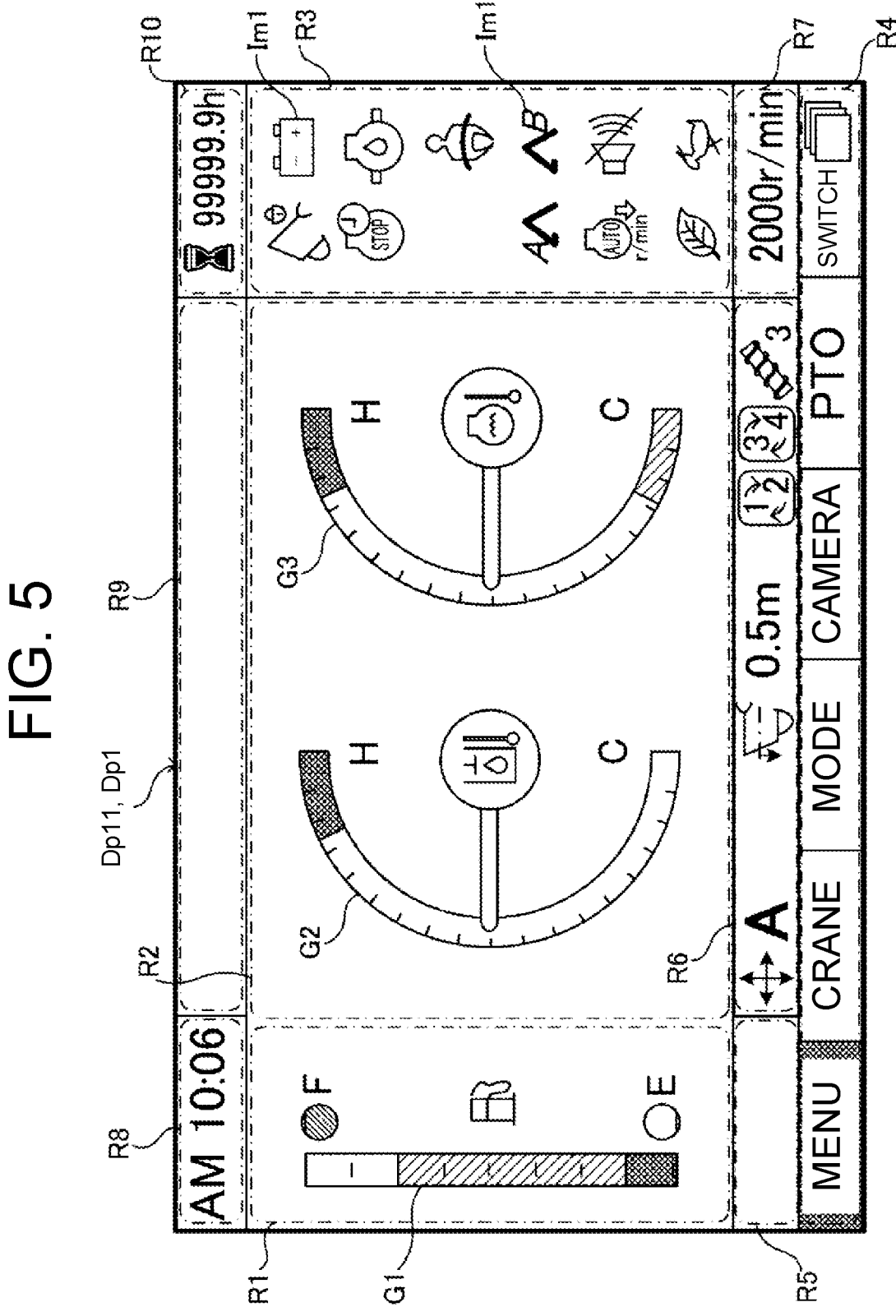
FIG. 5 is a diagram showing an example of a home screen displayed by a work machine control system according to the first embodiment.

The display screen Dp1 shown in FIG. 5 is a home screen Dp11 displayed by the control method.

The home screen Dp11 is the basic display screen Dp1 that is be displayed at the display device 2 in the active state (a state in which the machine body 30 moves according to the operation device 35's operation). According to an operation on the operation unit 22, the display screen Dp1 can shift from the home screen Dp11 to various display screens Dp1 including a menu screen, a crane screen, a mode screen, and a PTO screen.

As shown in FIG. 5, the home screen Dp11 includes a first region R1, a second region R2, a third region R3, a fourth region R4, a fifth region R5, a sixth region R6, a seventh region R7, an eighth region R8, a ninth region R9, and a tenth region R10.

Specifically, the display screen Dp1 is vertically (an upper/lower direction) divided into four regions.

Then, the upper three regions are further divided into three regions in the transverse direction (a right/left direction). Accordingly, the display screen Dp1 is divided into ten regions in total. Then, the second step regions from the top include, from left to right, the first region R1, the second region R2, and the third region R3. The lowest step region is the fourth region R4. Further, the third step regions from the top include, from left to right, the fifth region R5, the sixth region R6, and the seventh region R7, and the upper-most step regions include, from left to right, the eighth region R8, the ninth region R9, and the tenth region R10. Among the four regions vertically divided, a vertical size of the second step regions (the first region R1, the second region R2, and third region R3) from the top is the largest. Among the three regions transversely divided, a transverse size of middle regions (the second region R2, the sixth region R6, and the ninth region R9) is the largest.

However, the placement and size of the respective regions are merely examples and can be properly changed. The respective regions are not required to be clearly divided by a boundary line. For example, even in the example in FIG. 5; while the second and third regions R2, R3 are clearly divided by the boundary line, there is no boundary line between the first region R1 and the second region R2. Of course, the first region R1 and the second region R2 may be clearly divided by the boundary line.

The first region R1 is a rectangular region extending in the vertical direction. In the first region R1, for example, residual volume information G1 regarding a volume of fuel (e.g., diesel oil) remaining in the engine is displayed. Based on an output (a sensor signal) or the like of a residual volume sensor, the presentation processing unit 14 generates the residual volume information G1 in the display screen Dp1.

The second region R2, which occupies most of the home screen Dp11, is a rectangular region that is long in the transverse direction. In the control method according to the present embodiment, the second region R2 displays information on the active state of the work machine 3. As an example, the second region R2 displays a cooling water temperature information G3 and a hydraulic oil temperature information G2. Based on the output of a cooling water temperature sensor, the presentation processing unit 14 generates the cooling water temperature information G3 in the display screen Dp1 (home screen Dp11). Similarly, based on the output of the hydraulic oil temperature sensor, the presentation processing unit 14 generates the hydraulic oil temperature information G2 in the display screen Dp1 (home screen Dp11).

In the present embodiment, the cooling water temperature information G3 and the hydraulic oil temperature information G2 are each a graph that imitates an analog meter. In the analog meter, a needle rotates, and a value is presented according to a position of the needle. That is, the cooling water temperature information G3 is information that indexes the cooling water temperature included in the active state of the work machine 3, showing the cooling water temperature by the position of the needle of the graph. Similarly, the hydraulic oil temperature information G2 is information that indexes the hydraulic oil temperature included in the active state of the work machine 3, showing the hydraulic oil temperature by the position of the needle of the graph. An advantage of the graphical display of the cooling water temperature information G3 and hydraulic oil temperature information G2 is that the graphical display is highly visible to the user, and the user can sensibly understand the active state of the work machine 3. The cooling water temperature information G3 and the hydraulic oil temperature information G2 are not merely information that numerically or otherwise express the cooling water temperature and the hydraulic oil temperature respectively, but may also be information that step-by-step expresses the cooling water temperature and the hydraulic oil temperature respectively, for example, by means of a graphic image (icon).

The third region R3 is a rectangular region extending in the vertical direction. The third region R3 displays a graphic image (icon) Im1 showing whether each function of the work machine 3 is enable/disable, and abnormal/normal, etc. The third region R3 can display a plurality of graphic images Im1, and designs (pictures) of the individual graphic images Im1 show a function of which of a battery, a seat belt, a cooling water temperature, a hydraulic oil temperature, and the like is expressed. Here, each of the graphic images Im1 shows, for example, whether each function is enable/disable, and abnormal/normal, etc. by a display mode, such as display/non-display, display color, size, etc. Using outputs of various sensors (including the cooling water temperature sensor and the hydraulic oil temperature sensor) that detect the active state of each portion of the work machine 3, the presentation processing unit 14 determines a state of each portion in the work machine 3. When an abnormal value is detected in any site, the presentation processing unit 14 performs warning display by changing the display mode, such as a display color, of the graphic image Im1 of the site.

The fourth region R4 is a band-shaped region that extends across an entire width of the home screen Dp11. The fourth region R4 displays items for operation on the display screen Dp1. In FIG. 5, six items including "Menu", "Crane", "Mode", "Camera", "PTO", and "Switch" are placed in this order from left in the fourth region R4, as an example. The six push button switches 221 to 226 of the operation unit 22 positioned immediately below the six items are associated with the six items, respectively. For example, the item "Menu" is associated with the push button switch 221, and the item "Crane" is associated with the push button switch 222. Therefore, the user U1 (refer to FIG. 3), when operating the push button switch 224 associated with the item "Camera", operates (selects) the item "Camera".

Further, in the present embodiment, any of the items is highlighted in the fourth region R4 so as to correspond to an operation of an operation dial (or a cursor key) of the operation unit 22.

The item "Menu" is highlighted in the example in FIG. 5, and operating the operation dial (or the cursor key) switches the highlighted item. The user U1, by operating a determination button with a desired item highlighted, can select the desired item. Therefore, operating the determination button with the highlighted display shifted to the item "Camera", for example, means that the item "Camera" has been operated (selected). Further, when the operation unit 22 includes the touch screen, the user U1, by touching the desired item on the home screen Dp11, can select the desired item.

In the fifth region R5, a warning display (graphic image) icon is displayed to show that an abnormal value is detected by the various sensors (including the cooling water temperature sensor and the hydraulic oil temperature sensor). In the sixth region R6, for example, information on the work unit 33 during operation in the work machine 3 is displayed. In the seventh region R7, for example, information on the active state of the work machine 3, such as an engine speed, is displayed. In the eighth region R8, for example, the current time is displayed. In the ninth region R9, for example, information showing an item to which the currently displayed display screen Dp1 belongs is displayed. In the tenth region R10, for example, information on an operation time (hour meter) of the work machine 3 is displayed.

[3.2] Display Screen at Startup

The following is a detailed description of the control method according to the present embodiment, particularly a process related to displaying of the display screen Dp1 at the time of the work machine 3's startup.

In the present embodiment, as described above, the work machine 3 is so configured as to be able to switch from the inactive state (where the machine body 30 fails to move according to the operation device 35's operation) to the active state (where the machine body 30 moves according to the operation device 35's operation). For example, when the main switch 34 is off, the work machine 3 is in the inactive state, and after an elapse of the startup period after the main switch 34 being switched from off to on, the work machine 3 switches from the inactive state to the active state.

The control method according to the present embodiment has presenting the operation pattern information, which shows the current operation pattern, at the time of switching from the state (inactive state) in which the machine body 30 fails to move according to the operation device 35's operation to the state (active state) in which the machine body 30 moves according to the operation device 35's operation. That is, the presentation processing unit 14 of the control system 1 presents the operation pattern information, which shows the current operation pattern, at the time of switching from the state (inactive state) in which the machine body 30 fails to move according to the operation device 35's operation to the state (active state) in which the machine body 30 moves according to the operation device 35's operation.

Specifically, the presentation processing unit 14 reads out, from the storage unit 15, the operation pattern, as the "current operation pattern", which is set at the change processing unit 13, and presents, to the operator, the operation pattern information showing this "current operation pattern" in an identifiable mode. As an example, when the pattern "A", out of the four patterns including the pattern "A", the pattern "B", the pattern "C", and the pattern "D", is set (selected) at the change processing unit 13, the presentation processing unit 14 presents, to the operator, the information, as the operation pattern information, which shows that the current operation pattern is the pattern "A".

In short, in the present embodiment; when the work machine 3 switches from the inactive state to the active state, such as at the startup with the main switch 34 switching from off to on, the current operation pattern is presented as the operation pattern information. It is preferable that, in the control method (or control system 1) that uses, as a control target, the work machine 3 whose operation pattern is changeable, as in the present embodiment, the operator should recognize the current operation pattern thereafter to operate the operation device 35. Here, for example, when the operator is forced to visually observe the position of the switch lever thereby to check the operation pattern, the operator neglecting this checking operation may cause the machine body 30 to unexpectedly move according to the operation device 35's operation; therefore, the operator needs to carefully operate. In contrast, with the control method and control system 1 according to the present embodiment, the current operation pattern is actively presented as the operation pattern information at the time of switching from the inactive state to the active state; therefore, the operator can easily check the current operation pattern. As a result, it is possible to provide the work machine 3's control method, the work machine control program, the work machine control system 1, and the work machine 3 that easily reduce a burden on the operator for the operation.

Figure 6:
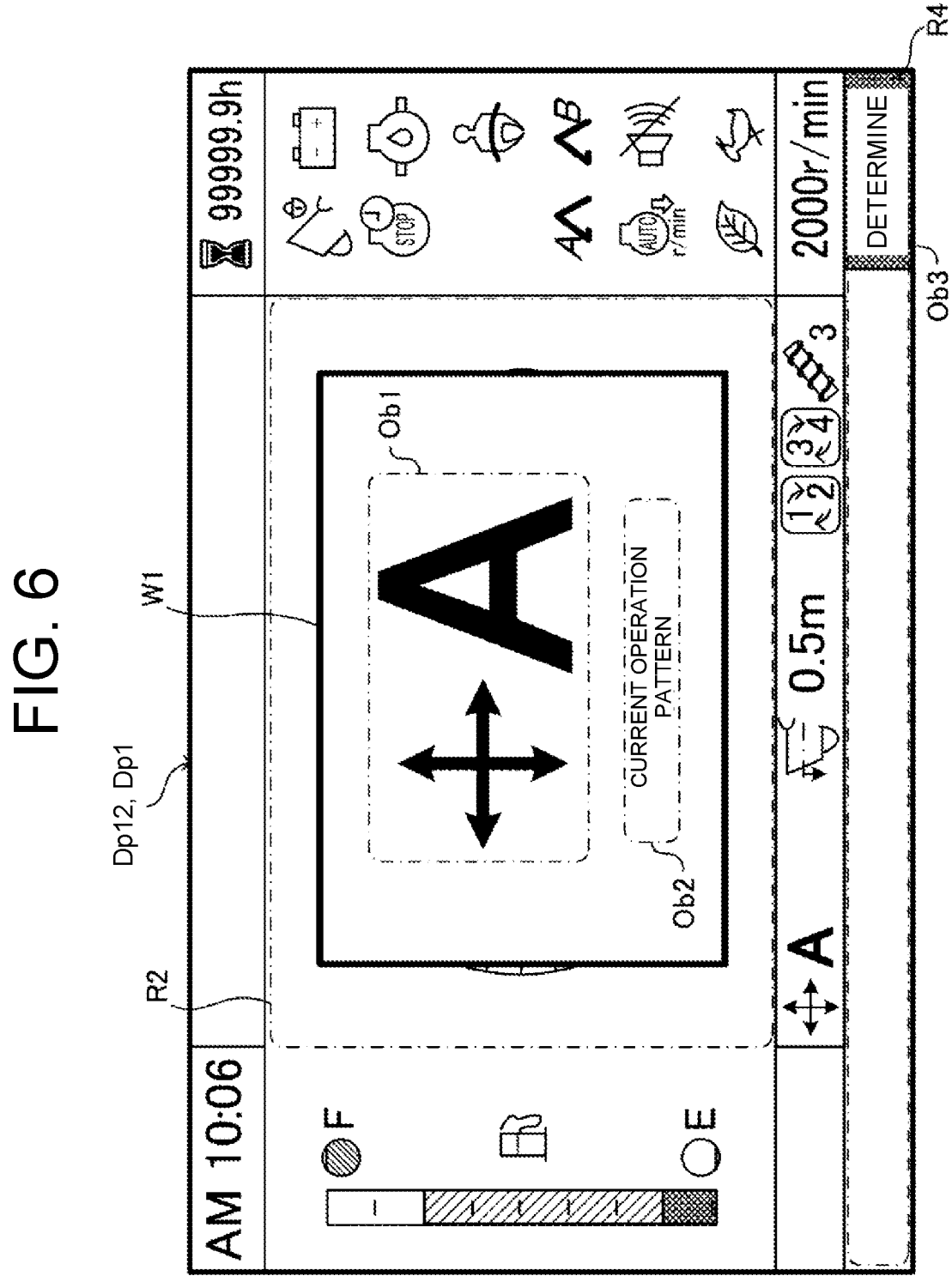
FIG. 6 is a diagram showing an example of a notification screen displayed by the work machine control system according to the first embodiment.

Here, the presentation processing unit 14 causes the display unit 23 of the display device 2 to display the operation pattern information, thereby to present the operation pattern information. More in detail, the presentation processing unit 14 causes the display device 2, which displays the home screen Dp11 in a state in which the machine body 30 moves according to the operation device 35's operation, to display a notification screen Dp12 (see FIG. 6) that includes the operation pattern information, thereby to present the operation pattern information. That is, in the present embodiment, displaying a notification screen Dp12, as shown in FIG. 6, on the display unit 23 of the display device 2 which displays the home screen Dp11 in the active state presents the operation pattern information. This allows the operator to visually recognize the current operation pattern from the notification screen Dp12 displayed at the display device 2.

As an example, the notification screen Dp12 is a screen on which a pop-up window W1 including the operation pattern information is overlapped on the home screen Dp11, as shown in FIG. 6. Specifically, the pop-up window W1 is overlapped on the second region R2. The pop-up window W1 includes a mark Ob1 and text Ob2 each as the operation pattern information. That is, the operation pattern information includes the mark Ob1 and the text Ob2. In the example in FIG. 6, the mark Ob1 is a graphic image (icon) with a crossed arrow and a letter "A" showing being the pattern "A", and the text Ob2 is a sentence meaning that the mark Ob1 represents the current operation pattern, such as "current operation pattern". That is, in the example in FIG. 6, the operation pattern information on the notification screen Dp12 shows that the current operation pattern is the pattern "A" (operation pattern for "ISO, made by company XX, made by company YY"). Therefore, displaying the above notification screen Dp12 at the display device 2 presents, to the operator, the operation pattern information showing the current operation pattern.

Further, on the notification screen Dp12, the item displayed in the fourth region R4 is different from that on the home screen Dp11. Right end in the fourth region R4 on the notification screen Dp12 displays a determination button Ob3 serving as an item "Determine". That is, the item "Determine" is displayed in place of the item "Switch" on the home screen Dp11. With the notification screen Dp12 displayed, the user U1, when operating the push button switch 226 that corresponds to the item "Determine", operates (selects) the item "Determine" (determination button Ob3).

Figure 7:
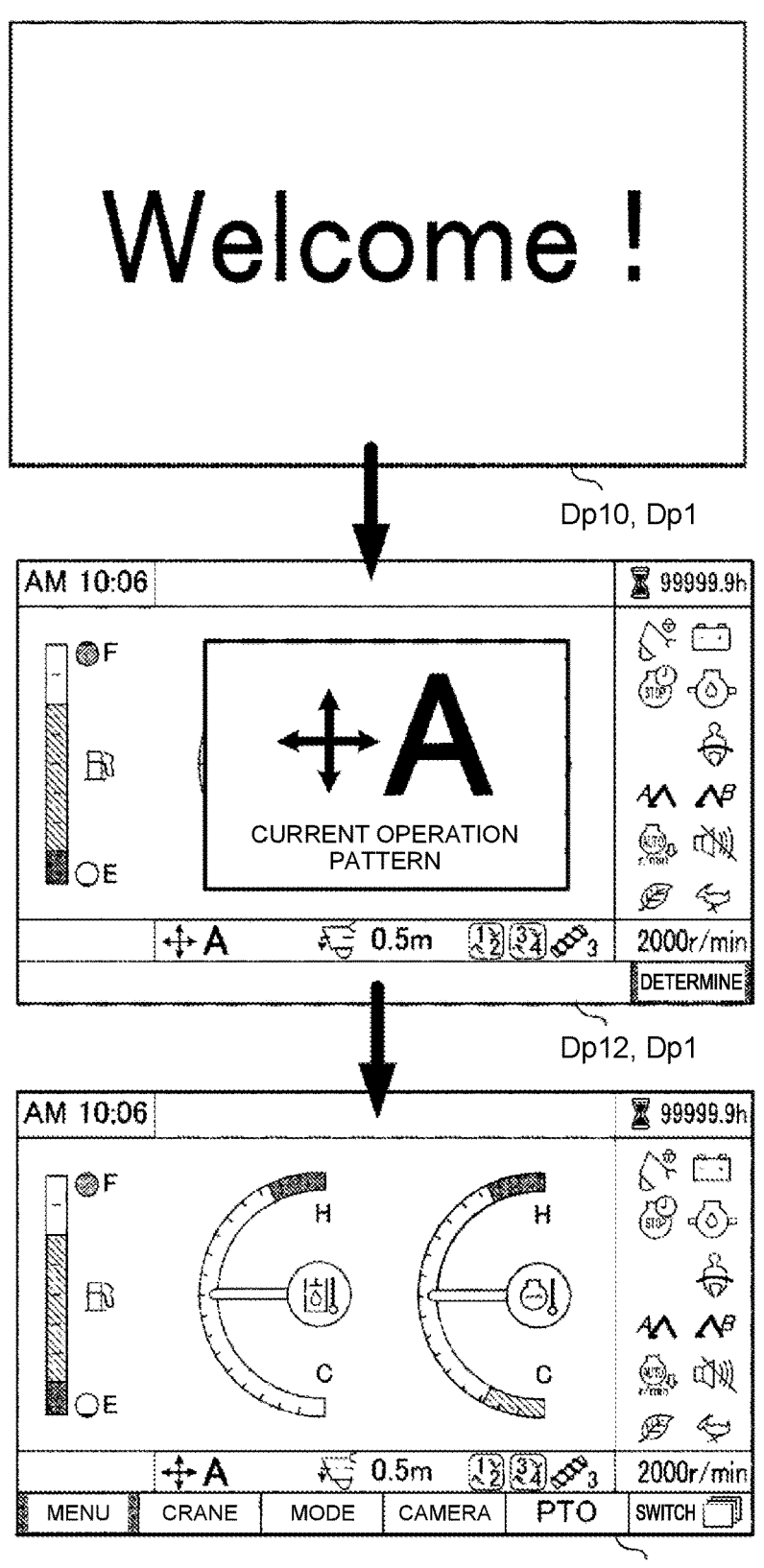
FIG. 7 is a conceptual diagram showing a shift state of a display screen displayed by the work machine control system according to the first embodiment.

In the present embodiment; at the time of the work machine 3's startup, the display screen Dp1 displayed at the display device 2 shifts as shown in FIG. 7. That is, the main switch 34 being switched from off to on turns on the power of the display device 2, the presentation processing unit 14 causes the display unit 23 of the display device 2 to display a startup screen Dp10 as the display screen Dp1, and then causes the display screen Dp1 to shift in the order of the notification screen Dp12 and the home screen Dp11.

The startup screen Dp10 includes a text showing that the work machine 3 is being started, such as "Welcome" or the name of the manufacturer of the work machine 3. The startup screen Dp10 Is displayed for the startup period of about several seconds after the power of the display device 2 is turned on, for example; with an elapse of the startup period, the display screen Dp1 displayed at the display device 2 shifts from the startup screen Dp10 to the notification screen Dp12. When the determination button Ob3 is operated (push button switch 226 is operated) during the displaying of the notification screen Dp12, the display screen Dp1 displayed at the display device 2 shifts from the notification screen Dp12 to the home screen Dp11. As an example in the present embodiment; during the startup period when the startup screen Dp10 is displayed, the work machine 3 is in the state where the machine body 30 fails to move according to the operation device 35's operation (inactive state). Meanwhile, during the period when the notification screen Dp12 or the home screen Dp11 is displayed, the work machine 3 is in the state where the machine body 30 moves according to the operation device 35's operation (active state).

Thus, after the power of the display device 2 is turned on, the notification screen Dp12 is displayed at the display device 2 before the displaying of the home screen Dp11. When the power of the display device 2 is turned on by the operator by turning on the main switch 34, for example, the display device 2 is to display the notification screen Dp12 at the work machine 3's switching from the inactive state to the active state. As a result, without being particularly conscious, the operator can easily grasp the current operation pattern on the notification screen Dp12 displayed at the display device 2.

Further, the presentation of the operation pattern information ends when a specific operation is performed. That is, in the present embodiment, when the determination button Ob3 is operated (the push button switch 226 is operated) during the displaying of the notification screen Dp12, the operation pattern information's presenting by the notification screen Dp12 ends, and the display screen Dp1 shifts to the home screen Dp11. In this way, the presentation of the operation pattern information ends triggered by the specific operation (in this case, the determination button Ob3's operation) from the operator (user U1), thereby making it easier for the operator to check the current operation pattern.

However, it is not essential that the work machine 3 should be in the inactive state during the startup period in which the startup screen Dp10 is displayed; in the startup period, the work machine 3 may be in the state in which the machine body 30 moves according to the operation device 35's operation (active state). In this case as well, the display screen Dp1 displayed at the display device 2, after the power being on, shifts in the order of the startup screen Dp10, the notification screen Dp12, and the home screen Dp11, as shown in FIG. 7. As a result, when the work machine 3 switches from the inactive state to the active state, the notification screen Dp12 after the displaying of the startup screen Dp10 in the active state presents the current operation pattern as the operation pattern information. In short, after the power of the work machine 3 is turned on, the operation pattern information showing the current operation pattern may be presented at the work machine 3's switching from the inactive state to the active state.

Similarly, during the period when the notification screen Dp12 or the home screen Dp11 is displayed, the work machine 3 may not necessarily be in the active state, and the machine body 30 may be in the state of failing to move according to the operation device 35's operation (inactive state). For example, assume that, between the off position and the engine's starting (ignition on) position, the operation position of the main switch 34 includes an accessory (ACC) on position for supplying power to the display device 2, etc. In this case, operating the main switch 34 from off to the accessory on keeps the machine body 30 in the inactive state due to the engine not started. At this time, the power is supplied to the display device 2, etc., so the display screen Dp1 displayed at the display device 2 shifts in the order of the startup screen Dp10, the notification screen Dp12, and the home screen Dp11, as shown in FIG. 7. In this case, after the power is supplied to the machine body 30; on the notification screen Dp12 seen before basic information on the machine body 30 is presented (displayed) as the home screen Dp11, the current operation pattern is to be presented as the operation pattern information.

In short, in the present embodiment, at least when the work machine 3 switches from the inactive state to the active state, the operation pattern information showing the current operation pattern should be presented. Thus, in addition to when the work machine 3 switches from the inactive state to the active state, even when the work machine 3 maintains the inactive state, for example, the operation pattern information may be presented at a specific timing. An example of the "specific timing" here includes the timing after power is supplied to the machine body 30, such as the accessory on described above, and before the basic information on the machine body 30 is presented.

By the way, the operation pattern information's presenting by the notification screen Dp12 may be performed not only at the time of the work machine 3's startup, but also when the cutoff lever 372 is operated, for example. That is, the presentation processing unit 14 presents the operation pattern information at the time of the switching from the inactive state to the active state, and it is preferable to present that the operation pattern information also when the cutoff lever 372 is operated from the "up position" to the "down position".

Specifically, when the cutoff lever 372, after an elapse of the startup period, is operated to the "up position" thereby to bring the cutoff switch 371 in a locked state (off), the work machine 3 is brought in the inactive state in which the work machine 3's movement is forcibly restricted regardless of the operation device 35's operation. In this state, the operator, when operating the cutoff lever 372 to the "down position" thereby to bring the cutoff switch 371 in the unlocked state (on) switches the work machine 3 from the inactive state to the active state. Then, it is preferable that, when the cutoff lever 372 is operated from the "up position" to the "down position" as described above, the presentation processing unit 14 causes the display device 2 to display the notification screen Dp12.

In short, it is preferable that the notification screen Dp12, after occurring of a specific event on the operation, should be displayed at the display device 2 before the displaying of the home screen Dp11. The "specific event" referred to here includes, for example, the cutoff lever 372's operation described above, as well as a change (replacement) of the operator. That is, it is preferable that replacing of the operator boarding the drive unit 321 should be detected based on the fastening and unfastening of the seat belt, etc., and the presentation processing unit 14 should cause the display device 2 to display the notification screen Dp12. With this, the current operation pattern is notified to the operator by the notification screen Dp12 at a proper timing, thus reducing the burden on the operator.

[3.3] Display Screen in Active State

The following is a detailed description of the control method according to the present embodiment, particularly a process related to the displaying of the display screen Dp1 in the active state of the work machine 3.

In the present embodiment, as described above, at the time of the work machine 3's startup, the display screen Dp1 displayed at the display device 2 shifts in the order of the startup screen Dp10, the notification screen Dp12, and the home screen Dp11. That is, in the switching from the inactive state (the machine body 30 fails to move according to the operation device 35's operation) to the active state (the machine body 30 moves according to the operation device 35's operation), the display screen Dp1 shifts in the order of the startup screen Dp10, the notification screen Dp12, and the home screen Dp11. Then, in the active state of the work machine 3, basically, the home screen Dp11 is displayed.

The basic configuration (layout, etc.) of the home screen Dp11 is as described in "[3.1] Home Screen". That is, the home screen Dp11 includes the information on the active state of the work machine 3. Specific examples of the information on the active state of the work machine 3 include the residual volume information G1 displayed in the first region R1, and the cooling water temperature information G3 and hydraulic oil temperature information G2 displayed in the second region R2. That is, the home screen Dp11 displays various information on the active state of the work machine 3; therefore, from the home screen Dp11 displayed at the display device 2, the operator can check various information necessary for the work machine 3's movement.

Further, in the present embodiment, the home screen Dp11 includes the operation pattern information. The operation pattern information included in the home screen Dp11, like the operation pattern information included in the notification screen Dp12, shows the current operation pattern. That is, from the storage unit 15, the presentation processing unit 14 reads out, as the "current operation pattern", the operation pattern set at the change processing unit 13; then, within the home screen Dp11, the presentation processing unit 14 displays the operation pattern information showing the "current operation pattern" in the identifiable mode. This allows the operator to check the current operation pattern even from the operation pattern information on the home screen Dp11.

As described above, the control method according to the present embodiment is to cause the display device 2 to display the home screen Dp11 that includes the information on the active state of the work machine 3 and the operation pattern information showing the current operation pattern. That is, the presentation processing unit 14 of the control system 1 causes the display device 2 to display the home screen Dp11 that includes the information on the active state of the work machine 3 and the operation pattern information showing the current operation pattern.

In short, in the present embodiment, the current operation pattern, as the operation pattern information, is presented (displayed) on the home screen Dp11 together with the information on the active state of the work machine 3. For example, when the operator is forced to check the operation pattern by visually observing the position of the switch lever, the operator neglecting this checking operation may cause the machine body 30 to unexpectedly move according to the operation device 35's operation; therefore, the operator needs to carefully operate. In contrast, with the control method and control system 1 of the present embodiment; on the home screen Dp11 displayed at the display device 2, the current operation pattern, as the operation pattern information, is actively presented (displayed) together with the information on the active state of the work machine 3, therefore, thus making it possible for the operator to easily check the current operation pattern. As a result, it is possible to provide the work machine 3's control method, the work machine control program, the work machine control system 1, and the work machine 3 that easily reduce a burden on the operator for the operation.

In the present embodiment, the home screen Dp11 also includes the graphic image Im1 that shows the information on the function of the work machine 3. The graphic image Im1 is displayed in the third region R3 and shows, by its display mode, whether each function of the work machine 3 is enable/disable, and abnormal/normal, etc. That is, the home screen Dp11 further includes the graphic image Im1 showing the information on the function of the work machine 3. With this, the operator can check, from the home screen Dp11, whether each function of the work machine 3 is enable/disable, and abnormal/normal, etc., in addition to the current operation pattern.

Figure 8:
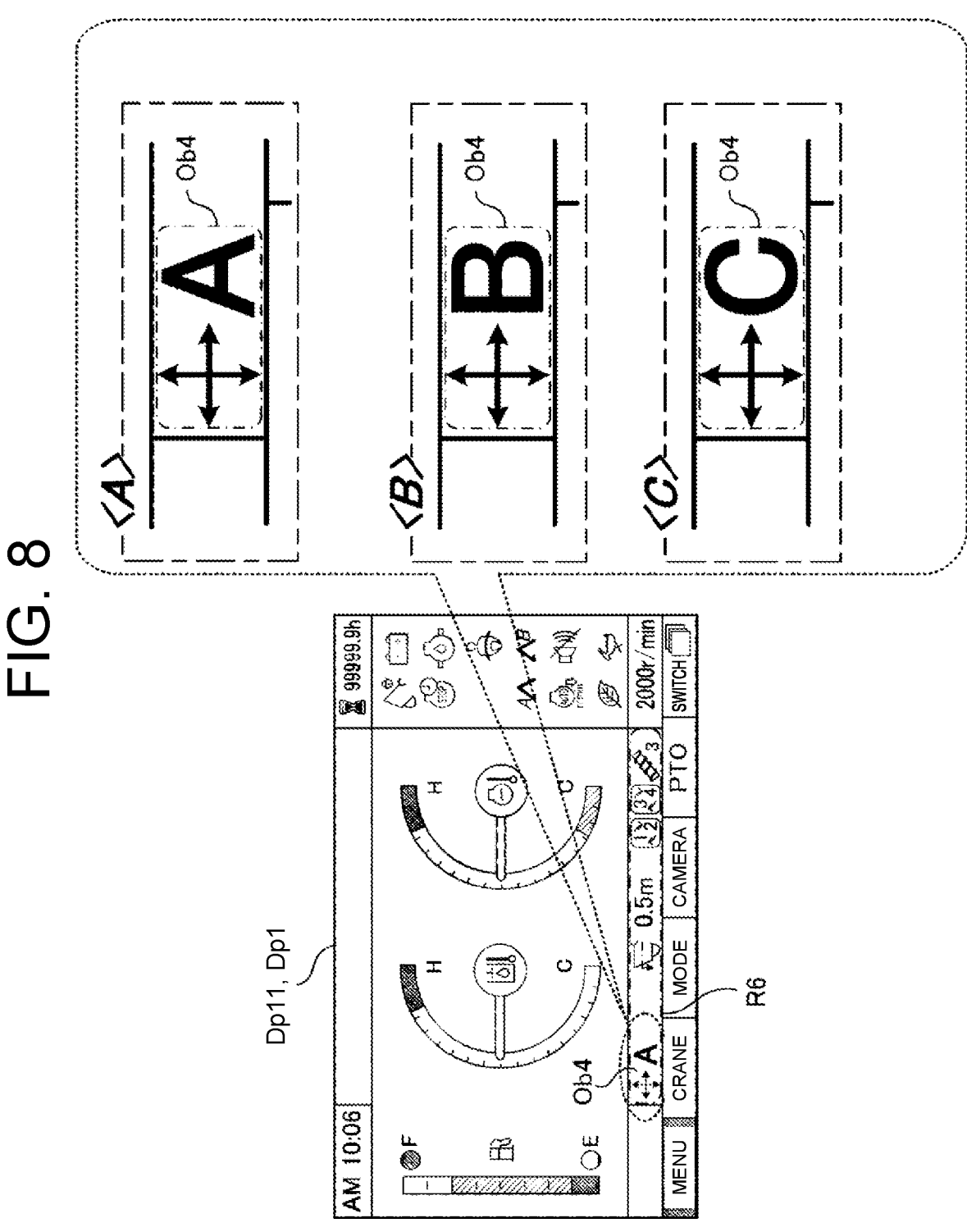
FIG. 8 is a diagram showing an example of the home screen displayed by the work machine control system according to the first embodiment.

As an example, in the sixth region R6, the home screen Dp11 includes the mark Ob4 as the operation pattern information, as shown in FIG. 8. That is, the operation pattern information on the home screen Dp11 includes the mark Ob4. In the example in FIG. 8, the mark Ob4 is the graphic image (icon) with the crossed arrow and the letter "A" showing being the pattern "A". That is, in the example in FIG. 8, the operation pattern information on the home screen Dp11 shows that the current operation pattern is the pattern "A" (operation pattern for ISO, made by company XX, made by company YY). Therefore, displaying the above home screen Dp11 at the display device 2 presents, to the operator, the operation pattern information showing the current operation pattern.

In FIG. 8, a display example that is a part (region around the mark Ob4) of the sixth region R6 of the home screen Dp11, and that is in a situation of three patterns of <A>, <B>, and <C> is shown in a balloon. That is, the <A> in FIG. 8 shows the mark Ob4 which is displayed on the home screen Dp11 when the current operation pattern is the pattern "A". The <B> in FIG. 8 shows the mark Ob4 which is displayed on the home screen Dp11 when the current operation pattern is the pattern "B" (the operation pattern for "made by company ZZ, made by company XY, made by company YX"). The <C> in FIG. 8 shows the mark Ob4 which is displayed on the home screen Dp11 when the current operation pattern is the pattern "C" (operation pattern for "made by company ZX, made by company YZ").

Thus, the operation pattern information included in the home screen Dp11 is displayed in a mode same as the mode of the operation pattern information included in the notification screen Dp12. This makes it easier for the operator to grasp the current operation pattern consistently through the notification screen Dp12 and the home screen Dp11. Here, the mark Ob4's display size on the home screen Dp11 is smaller than the mark Ob1's display size on the notification screen Dp12. In other words, at the display unit 23 of the display device 2, the mark Ob1 on the notification screen Dp12 is displayed larger than the mark Ob4 on the home screen Dp11. With this, comparing the home screen Dp11 with the notification screen Dp12, the notification screen Dp12 can present the operation pattern information with a relatively higher visibility. Thus, it is easier for the operator to recognize the current operation pattern when the notification screen Dp12 is displayed.

In the present embodiment, the presentation processing unit 14, on the home screen Dp11, displays the information on the active state of the work machine 3, then displaying the operation pattern information by using an available space. Therefore, a relatively simple screen configuration can be realized as the home screen Dp11, and the displaying of the operation pattern information on the home screen Dp11 is unlikely to be obtrusive, leading to improved visibility for the operator.

Here, on the home screen Dp11, the information on the active state of the work machine 3 and the operation pattern information are placed adjacent to each other. That is, the mark Ob4 as the operation pattern information is displayed in the sixth region R6, whereas the cooling water temperature information G3 and the hydraulic oil temperature information G2 each as the information on the active state of the work machine 3 are displayed in the second region R2. Further, the sixth region R6 and the second region R2 are so adjacent to each other as to be vertically aligned (see FIG. 5); therefore, the information on the active state of the work machine 3 and the operation pattern information are placed adjacent to each other. This accomplishes that the operation pattern information is displayed, on the home screen Dp11, in a position that is relatively easily visible to the operator operating the work machine 3. Further, the operation pattern information is not limited to being in the sixth region R6, but may be displayed in the fifth region R5, for example. In this case, the fifth region R5 is vertically aligned with the first region R1 where the residual volume information G1 is displayed, so the information on the active state of the work machine 3 and the operation pattern information are placed adjacent to each other.

Meanwhile, on the home screen Dp11, the graphic image Im1 and the operation pattern are so placed as to be spaced apart. That is, the mark Ob4 as the operation pattern information is displayed in the sixth region R6, whereas graphic image Im1 is displayed in the third region R3. And, the sixth region R6 and the third region R3 are not adjacent to each other but spaced apart from each other (see FIG. 5), thus placing the image Im1 and the operation pattern information spaced apart from each other. This makes the operation pattern information less likely to be mixed with the graphic image Im1, to be displayed in the home screen Dp11's position that is relatively easy for the operator of the work machine 3 to see.

By the way, the presentation processing unit 14, according to the operation by the operator (user U1), shifts the display screen Dp1, which is displayed at the display device 2, from the home screen Dp11 shown in FIG. 5 to another screen (such as the camera screen Dp13, etc.).

Figure 9:
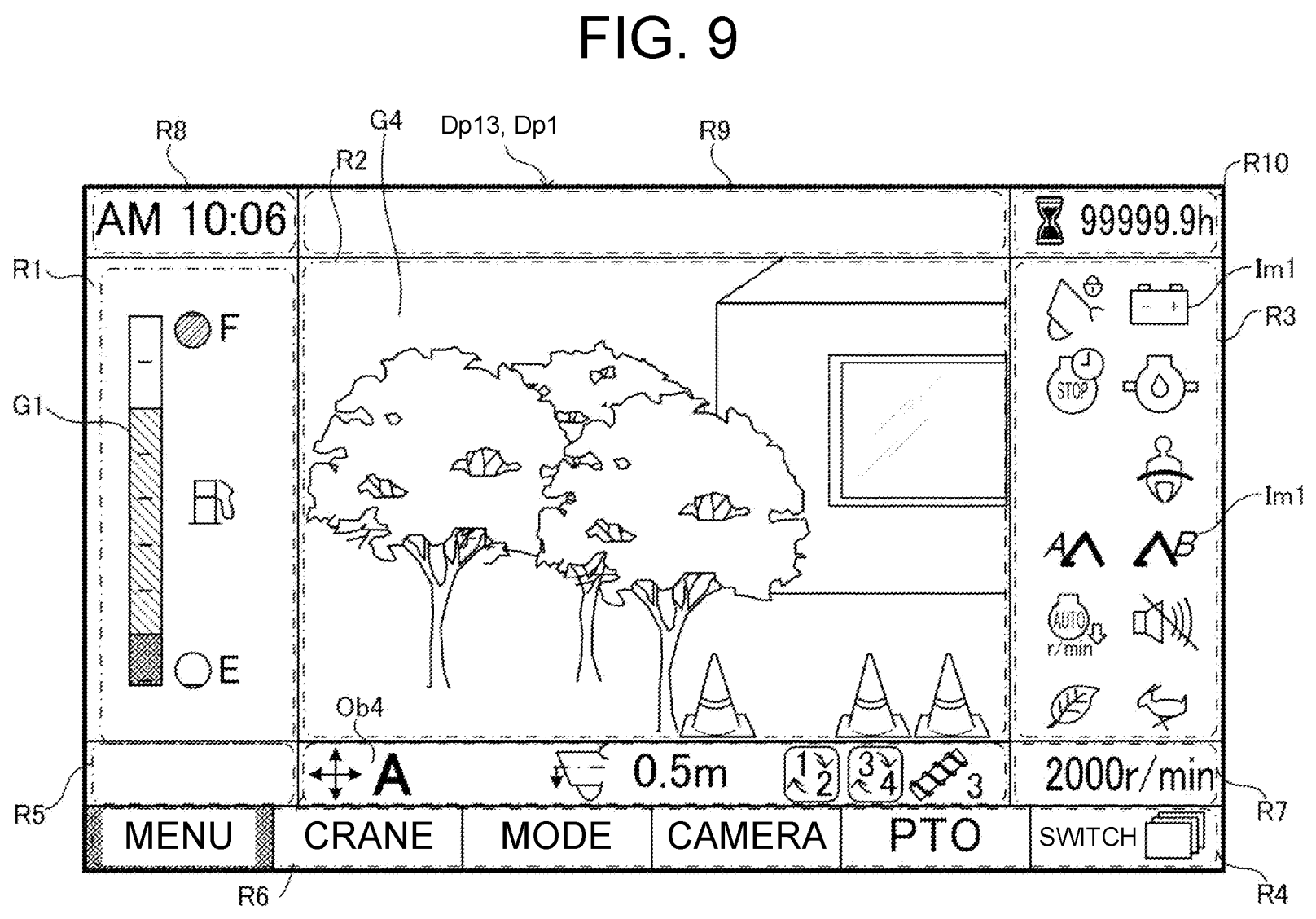

As an example, with the home Screen Dp11 displayed, operating, etc. of the push button switch 224 that corresponds to the item "Camera" thereby to operate (select) the item "Camera" causes a shift from the home screen Dp11 to the camera screen Dp13 as shown in FIG. 9. With the camera screen Dp13 displayed, operating (selecting) the item "Camera" causes a shift from the camera screen Dp13 to the home screen Dp11 or an entire display screen. However, the operation for shifting the display screen Dp1 and the order of shifts are not limited to the above examples, and can be properly changed.

The camera screen Dp13 shown in FIG. 9 is a type of the home screen Dp11, in which only the display content of the second region R2 is changed from the home screen Dp11 shown in FIG. 5. That is, the display other than the second region R2 is the same between the camera screen Dp13 and the home screen Dp11 which is shown in FIG. 5.

In the second region R2 of the camera screen Dp13; as the information to be displayed, information including a peripheral image G4 of the work machine 3 is displayed, in place of the cooling water temperature information G3 and the hydraulic oil temperature information G2. Based on the output (image data) of the camera 38, the presentation processing unit 14 generates the peripheral image G4 in the display screen Dp1 (camera screen Dp13). Here, the peripheral image G4 is displayed, as an example, triggered by that the engine is operating, and the cutoff switch 371, which prohibits the work machine 3's movement, is switched from the "locked state" to the "unlocked state".

Further, the camera screen Dp13, i.e., the home screen including the peripheral image G4 of the work machine 3 also includes the operation pattern information showing the current operation pattern. Specifically, in the sixth region R6, the camera screen Dp13 includes the mark Ob4 as the operation pattern information.

Therefore, even when the camera screen Dp13 is displayed at the display device 2, the operation pattern information showing the current operation pattern is presented to the operator.

Thus, the home screen Dp11's region (the second region R2) where at least a part of the information on the active state of the work machine 3 is displayed is capable of displaying the peripheral image G4 of the machine body 30. Therefore, in the peripheral image G4 displayed on the home screen Dp11, the operator can easily check the work machine 3's periphery (in this case, the rear) which is likely to be a dead area for the operator.

Here, the operation pattern information is placed around the home screen Dp11's region (second region R2) where the peripheral image G4 can be displayed. That is, the mark Ob4 as the operation pattern information is displayed in the sixth region R6, whereas the peripheral image G4 is displayed in the second region R2. And, the sixth region R6 and the second region R2 are so adjacent to each other as to be vertically aligned (see FIG. 9), placing the operation pattern information around the peripheral image G4. This accomplishes that even when the peripheral image G4 is displayed on the home screen Dp11, the operation pattern information is displayed on the home screen Dp11.

By the way, it is preferable that whether or not to display the operation pattern information in the home screen Dp11 should be determined according to at least one of the specification and type of the work machine 3. That is, the presentation processing unit 14 of the control system 1 is not required to ordinarily display the operation pattern information in the home screen Dp11, and may fail to display the operation pattern information in the home screen Dp11 depending on the work machine 3. With this, even with the same control method and control system 1 (or control program) being used, the home screen Dp11 including proper information can be displayed according to the specification or type of work machine 3.

Specifically, when the work machine 3 is free from the function to change the operation pattern, the operation pattern information is not displayed in the home screen Dp11. That is, when acquiring data pertaining to at least one of the specification and type of the work machine 3, and determining, from the data, that the work machine 3 is free from the function to change the operation pattern, the presentation processing unit 14 causes the display device 2 to display the home screen Dp11 failing to include the operation pattern information. Meanwhile, when determining that the work machine 3 has the function to change the operation pattern, the presentation processing unit 14 causes the display device 2 to display the home screen Dp11 including the operation pattern information. As a result, for the work machine 3 free from the function to change the operation pattern, the operation pattern information is excluded from the home screen Dp11 displayed at the display device 2, making it possible to efficiently display the necessary information only.

Further, it is preferable that the operation pattern information in the home screen Dp11 should correspond to the notation of the name plate 39 (see FIG. 4) attached to the machine body 30. That is, it is preferable that the operation pattern information displayed in the sixth region R6 of the home screen Dp11 should include a graphic image same as the graphic image noted on the name plate 39, for example. This allows the operator to grasp the detail of each operation pattern based on a familiar notation similar to that on the name plate 39.

[3.4] Change of Operation Pattern

The following is a detailed description of the control method according to the present embodiment, particularly a process related to the displaying of the display screen Dp1 for the change of the operation pattern.

In the present embodiment, as described above, the change processing unit 13 of the control system 1 executes the changing process to change the operation pattern, making it possible to change the operation pattern which is the correspondence between the operation device 35's operation and the machine body 30's movement. Here, the operation pattern is set (changed) according to the operation of the operator (user U1). That is, the operator, by selecting any pattern from the pattern A, the pattern B, the pattern C, and the pattern D, changes the current operation pattern.

Figure 10:
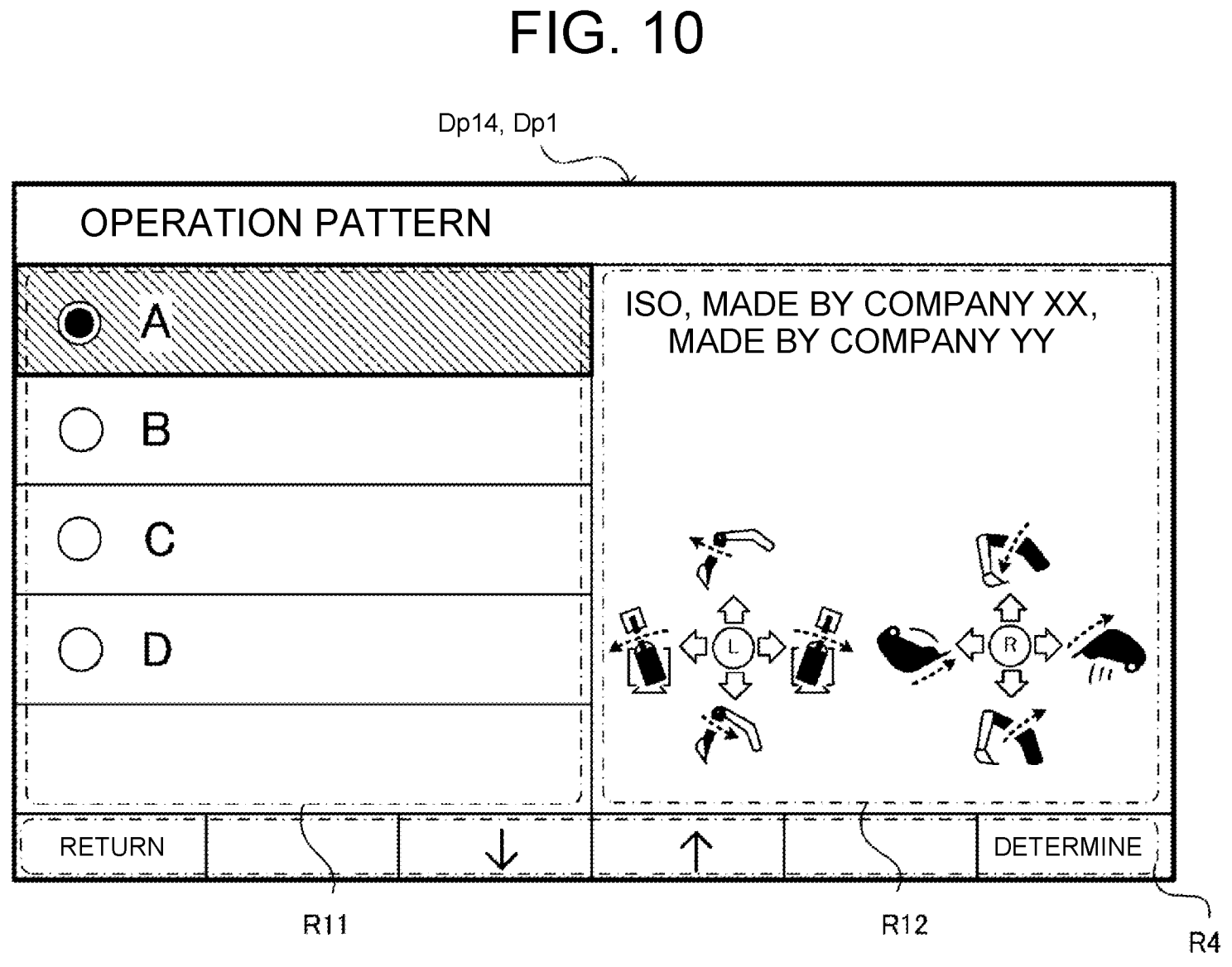

Specifically, as shown in FIG. 10, the presentation processing unit 14 has the function of displaying, at the display device 2, a change screen Dp14, as the display screen Dp1, that is for changing the operation pattern. The operation pattern selected on the change screen Dp14 is set as the "current operation pattern" by the change processing unit 13. With this, the operator, while visually checking by the display device 2, can determine the operation pattern which is the correspondence between the operation device 35's operation and the machine body 30's movement.

As an example, the change screen Dp14, as shown in FIG. 10, has an eleventh region R11 and a twelfth region R12, instead of the home screen Dp11's first region R1 to third region R3 and fifth region R5 to seventh region R7. The fourth region R4 of the change screen Dp14 displays the "Up" and "Down" cursor items, the "Return" item to return to the previous screen, and the item "Determine".

The eleventh region R11 displays the operation pattern's options including the pattern A, the pattern B, the pattern C Pattern, and the pattern D. The eleventh region R11 highlights any of the pattern A, the pattern B, the pattern C, and the pattern D. Operating the cursor of the fourth region R4 switches the highlighted pattern. Further, a radio button is associated with each of the pattern A, the pattern B, the pattern C, and the pattern D, and the radio button corresponding to the selected pattern is "on". In the example in FIG. 10, the "Pattern A" is highlighted and the "Pattern A" is selected as the operation pattern.

In the twelfth region R12, detailed information on the highlighted operation pattern is displayed as changed pattern information. In the example in FIG. 10, the twelfth region R12 displays detailed information of the highlighted "A pattern". Here, the detailed information as the changed pattern information includes a graphic image (icon) that shows the correspondence between the operation device 35's operation and the machine body 30's movement. Specifically, the detailed information includes the text "ISO, made by company XX, made by company YY", and a graphic image showing a combination of the operation direction of each of a pair of operation levers 351, 352 with the machine body 30's movement. The detailed information displayed in the twelfth region R12 is information corresponding to the notation of the name plate 39 (see FIG. 4), and includes, for example, a graphic image same as the graphic image noted on the name plate 39.

Figure 11:
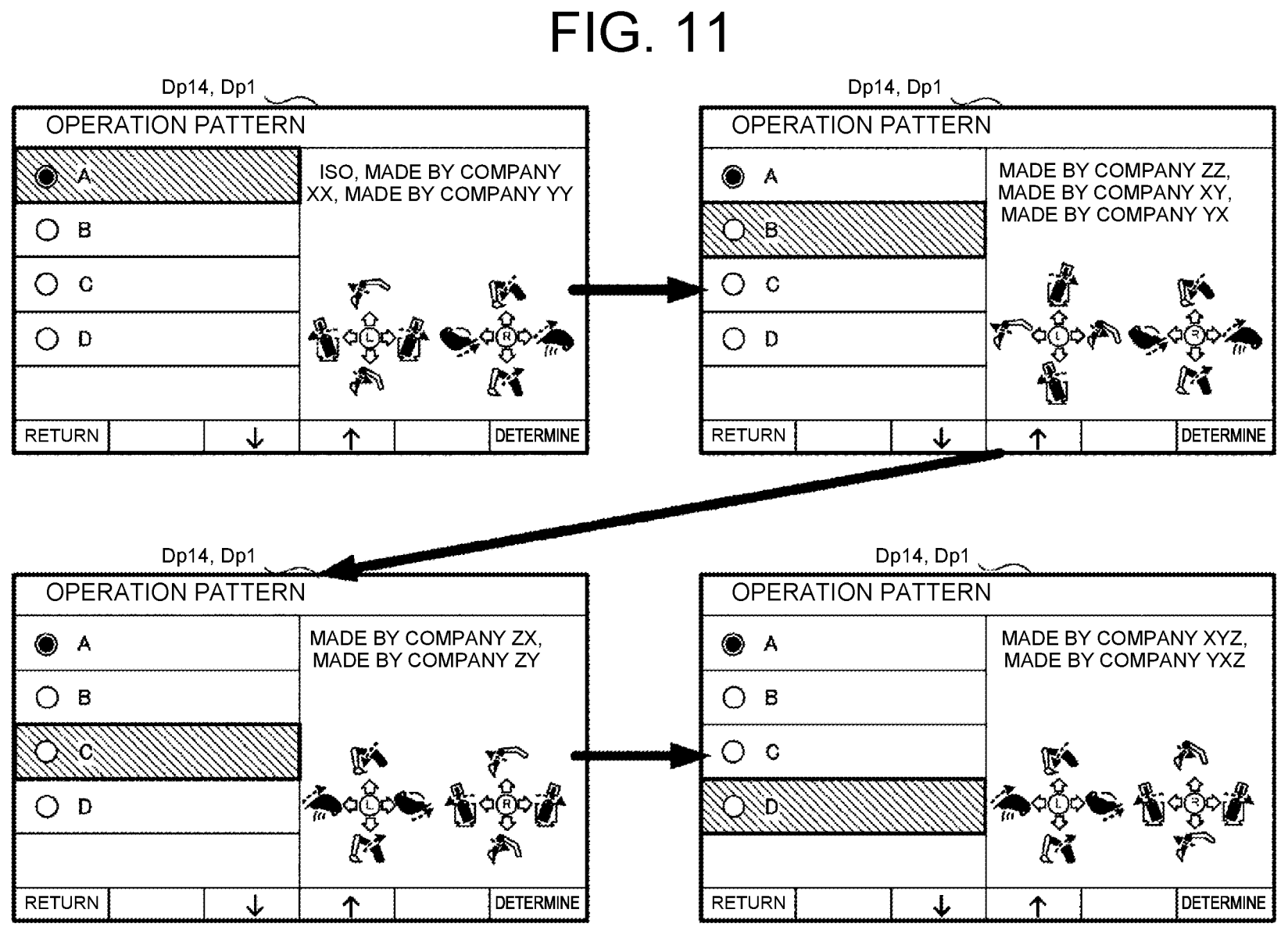

According to the above change screen Dp14, as shown in FIG. 11, operating the cursor in the fourth region R4 switches the highlighted pattern. Accordingly, the detailed information displayed in the twelfth region also switches to the detailed information of the highlighted pattern. Therefore, the operator, by operating the item "Determine" with the desired pattern highlighted, can select the desired pattern.

As described above, the change screen Dp14 includes the changed pattern information (detailed information) showing the changed operation pattern. This makes it easier for the operator to grasp the operation pattern that is to be changed by the change screen Dp14, facilitating the changing of the operation pattern. Further, the changed pattern information (detailed information) in the change screen Dp14 corresponds to the notation of the name plate 39 attached to the machine body 30. This allows the operator to grasp the detail of each operation pattern based on a familiar notation similar to that on the name plate 39.

Figure 12:
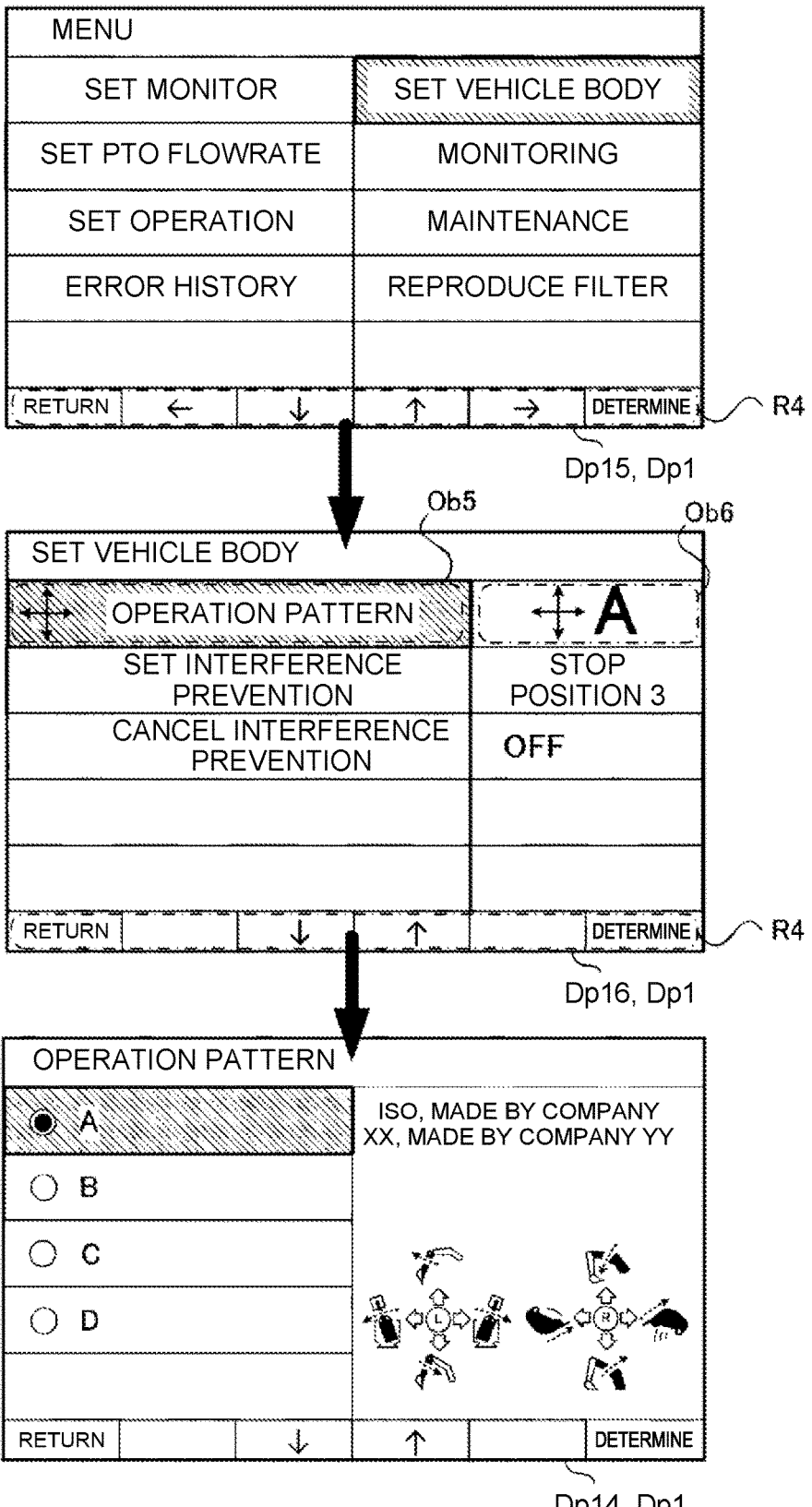
FIG. 12 is a conceptual diagram showing a shift state of the display screen displayed by the work machine control system according to the first embodiment.

By the way, so as to display the above change screen Dp14 with the home screen Dp11 displayed, the display screen Dp1 at the display device 2 shifts as shown in FIG. 12. That is, with the item "Menu" operated (selected) on the home screen Dp11, the presentation processing unit 14 causes the display unit 23 of the display device 2 to display a menu screen Dp15 as the display screen Dp1, thereafter shifting the display screen Dp1 in the order of a vehicle body change screen Dp16 and the change screen Dp14.

The menu screen Dp15 includes, in addition to "Set Vehicle Body", various items such as "Set Monitor", "Set PTO Flowrate", "Set Operation", and the like. In the menu screen Dp15, operating (selecting) the item "Determine" with a cursor operation (in the fourth region R4) selecting the "Set Vehicle Body" shifts the display screen Dp1, which is displayed at the display device 2, from the menu screen Dp15 to the vehicle body change screen Dp16.

The vehicle body change screen Dp16 includes, other than the "Operation Pattern", various items such as "Set Interference Prevention" and "Cancel Interference Prevention". The vehicle body change screen Dp16 is a type of a call up screen for calling up the change screen Dp14; the item "Operation Pattern" in the vehicle body change screen Dp16 functions as a call up object Ob5 that accepts an operation to call up the change screen Dp14. That is, on the vehicle body change screen Dp16, operating (selecting) the item "Determine" with the cursor operation (in the fourth region R4) selecting the call up object Ob5 noted "Operation Pattern" shifts the display screen Dp1, which is displayed at the display device 2, from the vehicle body change screen Dp16 to the change screen Dp14.

Further, on the right side of the mark Ob5, the vehicle body change screen Dp16 includes a mark Ob6, as the operation pattern information, that corresponds to the call up object Ob5. That is, the operation pattern information on the vehicle body change screen Dp16 as the call up includes the mark Ob6. In the example in FIG. 12, the mark Ob6 is a graphic image (icon) of a crossed arrow and the letter "A" showing being the pattern "A". That is, in the example in FIG. 12, the operation pattern information on the vehicle body change screen Dp16 shows that the current operation pattern is the pattern "A" (operation pattern for "ISO, made by XX, made by YY"). Therefore, displaying the above vehicle body change screen Dp16 at the display device 2, at least when calling up the change screen Dp14, presents, to the operator, the operation pattern information showing the current operation pattern.

As described above, the control method according to the present embodiment includes causing the display device 2 to display the change screen Dp14 for changing the operation pattern, and causing the display device 2 to display the call up screen (vehicle body change screen Dp16) for calling up the change screen Dp14. That is, the presentation processing unit 14 of the control system 1 causes the display device 2 to display the change screen Dp14 for changing the operation pattern, and the call up screen (vehicle body change screen Dp16) for calling up the change screen Dp14. Here, the call up screen (vehicle body change screen Dp16) includes the operation pattern information showing the current operation pattern. The term "call" referred to in the present disclosure means to cause the display device 2 to display the display screen Dp1 such as the change screen Dp14.

In short, in the present embodiment, the current operation pattern is presented (displayed) as the operation pattern information on the call up screen (vehicle body change screen Dp16) when the operation pattern is to be changed. For example, when the operator is forced to check the operation pattern by visually observing the position of the switch lever, the operator neglecting this checking operation may cause the machine body 30 to unexpectedly move according to the operation device 35's operation; therefore, the operator needs to carefully operate. In contrast, with the control method and control system 1 according to the present embodiment, when the operation pattern is to be changed, the current operation pattern is actively presented (displayed) as the operation pattern information, making it possible for the operator to easily check the current operation pattern. As a result, it is possible to provide the work machine 3's control method, the work machine control program, the work machine control system 1, and the work machine 3 that easily reduce a burden on the operator for the operation.

Further, in the present embodiment, the change screen Dp14 for changing the operation pattern is called up from the home screen Dp11 via one or more screens (in this case, the menu screen Dp15 and the vehicle body change screen Dp16). That is, the control method according to the present embodiment, in a state in which the machine body 30 moves according to the operation device 35's operation, causes the display device 2 to display the home screen Dp11. Then, the display screen Dp1 displayed at the display device 2 shifts from the home screen Dp11 via the call up screen (vehicle body change screen Dp16), which is different from the home screen Dp11, to the change screen Dp14. Creating the above hierarchical screen configuration indirectly, not directly, calls up the change screen Dp14 from the home screen Dp11, suppressing the change screen Dp14 from being unintentionally opened due to the operator's error or the like.

Further, the call up screen (vehicle body change screen Dp16) includes the call up object Ob5 that accepts the operation for calling up the change screen Dp14. The operation pattern information is displayed in association with the call up object Ob5. According to this configuration, the operator, when operating the call up object Ob5 thereby to call up the change screen Dp14, easily sees the operation pattern information showing the current operation pattern.

By the way, the operation pattern information's presenting by the notification screen Dp12 may be performed not only at the time of the work machine 3's startup and of the cutoff lever 372's operation, but also, for example, after changing (setting) the operation pattern. That is, it is preferable that the presentation processing unit 14 should present the operation pattern information, also when the operation pattern is changed on the change screen Dp14.

Specifically, it is preferable that, on the change screen Dp14, when the operator, while selecting any of the operation pattern, operates the item "Determine" thereby to set (select) the desired pattern, the presentation processing unit 14 should cause the display device 2 to display the notification screen Dp12.

When the determination button Ob3 is operated (push button switch 226 is operated) during the displaying of the notification screen Dp12, the display screen Dp1 displayed at the display device 2 shifts from the notification screen Dp12 to the home screen Dp11.

In short, it is preferable that the notification screen Dp12 should be displayed at the display device 2 at the time of the shift from a specific screen to the home screen Dp11. The "specific screen" referred to here is a screen other than the home screen Dp11 displayed, as the display screen Dp1, at the display device 2, and includes the change screen Dp14, etc. described above. With this, the current operation pattern is notified to the operator by the notification screen Dp12 at a proper timing, thus reducing the burden on the operator.

By the way, in the control method according to the present embodiment, the operation pattern is changeable only in the state in which the machine body 30 fails to move according to the operation device 35's operation, out of the state in which the machine body 30 fails to move according to the operation device 35's operation and the state in which the machine body 30 moves according to the operation device 35's operation. That is, the inactive state and the active state are provided each as a state of the work machine 3, and the change processing unit 13 can accept the operation to change the operation pattern only in the inactive state, but does not accept the operation to change the operation pattern in the active state. It is assumed that, in the active state, prohibiting the displaying itself of the change screen Dp14, for example, does not accept the operation to change the operation pattern. However, not limited to the above, it is permitted that, in the active state, prohibiting the operation of the item "Determine" on the change screen Dp14 does not accept the operation to change the operation pattern. This changes the operation pattern with the work machine 3 in the active state, making it possible to prevent any sudden change from occurring to the machine body 30's movement that corresponds to the operation device 35's operation.

Here, switching between the state (inactive state) in which the machine body 30 fails to move according to the operation device 35's operation and the state (active state) in which the machine body 30 moves according to the operation device 35's operation is performed at least according to the cutoff lever 372's operation. That is, when the cutoff lever 372 is operated to the "down position" thereby to bring the cutoff switch 371 in the unlocked state (on), the work machine 3 is in the active state. In this state, the change processing unit 13 does not accept the operation to change the operation pattern. Meanwhile, when the cutoff lever 372 is operated to the "up position" thereby to bring the cutoff switch 371 in the locked state (off), the work machine 3 is in the inactive state; therefore, the change processing unit 13 accepts the operation to change the operation pattern.

With this, operating the cutoff lever 372 makes it possible to easily switch between the state in which the operation pattern is changeable and the state in which the operation pattern is unchangeable.

The configuration that makes the operation pattern changeable only in the inactive state in which the machine body 30 fails to move according to the operation device 35's operation can be adopted independently of the function to display the change screen Dp14 and the call up screen (vehicle body change screen Dp16). In short, the control method according to the present embodiment is a control method of the work machine 3 provided with the machine body 30 that moves according to the operation device 35's operation and that is capable of changing the operation pattern which is the correspondence between the operation device 35's operation and the machine body 30's movement; it is sufficient that, the operation pattern is changeable only in the state in which the machine body 30 fails to move according to the operation device 35's operation, out of the state in which the machine body 30 fails to move according to the operation device 35's operation and the state in which the machine body 30 moves according to the operation device 35's operation. In this case, adopting the function to display the change screen Dp14 and the call up screen (vehicle body change screen Dp16) is not essential.

[3.5] Overall Process

Next, the overall flow of processes related to the control method will be described with reference to FIG. 13. FIG. 13 is a flowchart showing an example of a process related to the control method.

As shown in FIG. 13, the control system 1 first determines whether or not the main switch 34 is turned on (S1). Turning on the main switch 34 (S1: Yes) turns on the power of the display device 2, and the presentation processing unit 14 of the control system 1 causes the display unit 23 of the display device 2 to display the startup screen Dp10 as the display screen Dp1 (S2). After an elapse of the startup period of about several seconds, the presentation processing unit 14 causes the display unit 23 of the display device 2 to display the notification screen Dp12, as the display screen Dp1, that includes the operation pattern information (S3).

Then, with the determination button Ob3 operated (the push button switch 226 operated) during the displaying of the notification screen Dp12, the presentation processing unit 14 causes the display unit 23 of the display device 2 to display the home screen Dp11, as the display screen Dp1, that includes the operation pattern information (S4). It is not essential that the displaying of the notification screen Dp12 ends with the operation of the determination button Ob3; for example, the displaying of the notification screen Dp12 may end after an elapse of a certain time period from the start of displaying the notification screen Dp12. In this case, after an elapse of the certain time period from the start of displaying the notification screen Dp12, the presentation processing unit 14 shifts the display screen Dp1 from the notification screen Dp12 to the home screen Dp11 regardless of the operation of the determination button Ob3.

During the displaying of the home screen Dp11, the control system 1 determines whether or not the operation for calling up the change screen Dp14 has been performed (S5). Specifically, when "Menu" is selected on the home screen Dp11, the presentation processing unit 14 causes the display unit 23 of the display device 2 to display the menu screen Dp15 as the display screen Dp1, whereas when "Set Vehicle Body" is selected on the menu screen Dp15, the presentation processing unit 14 causes the display unit 23 of the display device 2 to display the vehicle body change screen Dp16 as the display screen Dp1. When the call up object Ob5 on the vehicle body change screen Dp16 is selected, the presentation processing unit 14 causes the display unit 23 of the display device 2 to display the change screen Dp14 as the display screen Dp1. That is, with these series of operations, it is determined that the operation for calling up the change screen Dp14 has been performed (S5: Yes). Until these series of operations are performed, the control system 1 continues to determine whether or not the operation for calling up the change screen Dp14 (S5) has been performed.

When the operation for calling up the change screen Dp14 has been performed (S5: Yes), the control system 1 determines whether or not the "locked state" in which the work machine 3's movement is restricted is created (S6). At this time, when the cutoff lever 372 is in the "down position" and the cutoff switch 371 is in the unlocked state (on), the control system 1 determines that the "locked state" is not created (S6: No), and returns the process to step S4. Meanwhile, when the cutoff lever 372 is in the "up position" and the cutoff switch 371 is in the locked state (off), the control system 1 determines that the "locked state" is created (S6: Yes), and shifts the process to step S7.

In step S7, the presentation processing unit 14 causes the display unit 23 of the display device 2 to display the change screen Dp14 that is as the display screen Dp1 and that is for changing the operation pattern. During the displaying of the change screen Dp14, the change processing unit 13 of the control system 1, according to the operation of the operator (user U1), sets the desired pattern as the "current operation pattern" (S8). Then, the presentation processing unit 14 causes the display unit 23 of the display device 2 to display the notification screen Dp12 that is as the display screen Dp1 and that includes the operation pattern information (S9). Then, with the determination button Ob3 operated (the push button switch 226 operated) during the displaying of the notification screen Dp12, the presentation processing unit 14 causes the display unit 23 of the display device 2 to display the home screen Dp11, as the display screen Dp1, that includes the operation pattern information (S4).

The control system 1 repeatedly executes the processes in step S1 to step S9 described above. However, the flowchart shown in FIG. 13 is merely one example; thus, the process may be properly added or omitted, and the order of the processes may be properly changed.

[4] Modified Examples

A description will hereinafter be made on modified examples of the first embodiment. The modified examples, which will be described below, can be applied in proper combination.

The control system 1 according to the present disclosure includes the computer system. The computer system has, as hardware, one or more processors and one or more storages. The processor, by executing the program recorded in the storage of the computer system, realizes the function as the control system 1 in the present disclosure. The program may be preliminarily recorded in the storage of the computer system, may be provided through an electric communication line, or may be provided in a manner to be recorded in a non-transitory recording medium, such as a memory card, an optical disk, a hard disk drive, or the like, each of which is readable by the computer system. Further, a part of or all of the functional units included in the control system 1 may be composed of an electronic circuit.

A configuration in which at least a part of the functions of the control system 1 is integrated in one case is not essential for the control system 1, and the components of the control system 1 may be provided in a plurality of cases in a distributed manner. Conversely, in the first embodiment, functions that are distributed to a plurality of devices (such as the control system 1 and the display device 2) may be integrated in one case. Further, at least a part of the functions of the control system 1 may be realized by a cloud (cloud computing) or the like.

Further, the power source of the work machine 3 is not limited to the diesel engine, but may be, for example, an engine other than the diesel engine, a motor (electric motor), or a hybrid power source that includes the engine and the motor (electric motor).

Further, the display device 2 is not limited to a dedicated device, but may be a general-purpose terminal, such as a laptop computer, a tablet terminal, or a smartphone. Further, the display unit 23 is not limited to the mode of directly displaying the display screen Dp1, such as a liquid crystal display or an organic EL display, but may also be configured to display the display screen Dp1 by projection, for example, like a projector. The display region of the display unit 23 is not limited to being transversely long, but may also be vertically long.

Further, as the operation unit 22's mode of inputting information of, any mode other than the push button switches 221 to 226, the touch screen, and operation dial may be adopted. For example, the operation unit 22 may adopt any mode such as a keyboard, a pointing device such as mouse, a voice input, a gesture input, or inputting an operation signal from another terminal.

The operation device 35, the display device 2, etc. are not limited to having the configuration installed on the machine body 30, but may be installed separately from the machine body 30, for example. In this case, the operation device 35, the display device 2, etc., are configured to be communicable with the machine body 30, realizing a remote control the machine body 30.

Further, the display mode of the operation pattern information on each of the notification screen Dp12, home screen Dp11, and vehicle body change screen Dp16 (call up screen) are not limited to the marks as described above, but can be, for example, text, photograph, display/non-display or animation, or a combination of the above.

It is not essential that the operation pattern set at the change processing unit 13 should be selected from a plurality of alternative patterns, but may be freely customized by the operator (user U1). Specifically, for example, on the change screen Dp14, the operator individually specifies the machine body 30's movement to be associated with the operation of each of the operation levers 351, 352, thereby to freely customize the operation pattern.

The mode of the operation pattern information's presenting by the presentation processing unit 14 is not limited to display, but may be, for example, sound (including voice), printing, sending to another terminal or writing in a non-transient recording medium, or a combination thereof.

Second Embodiment

Figure 14:
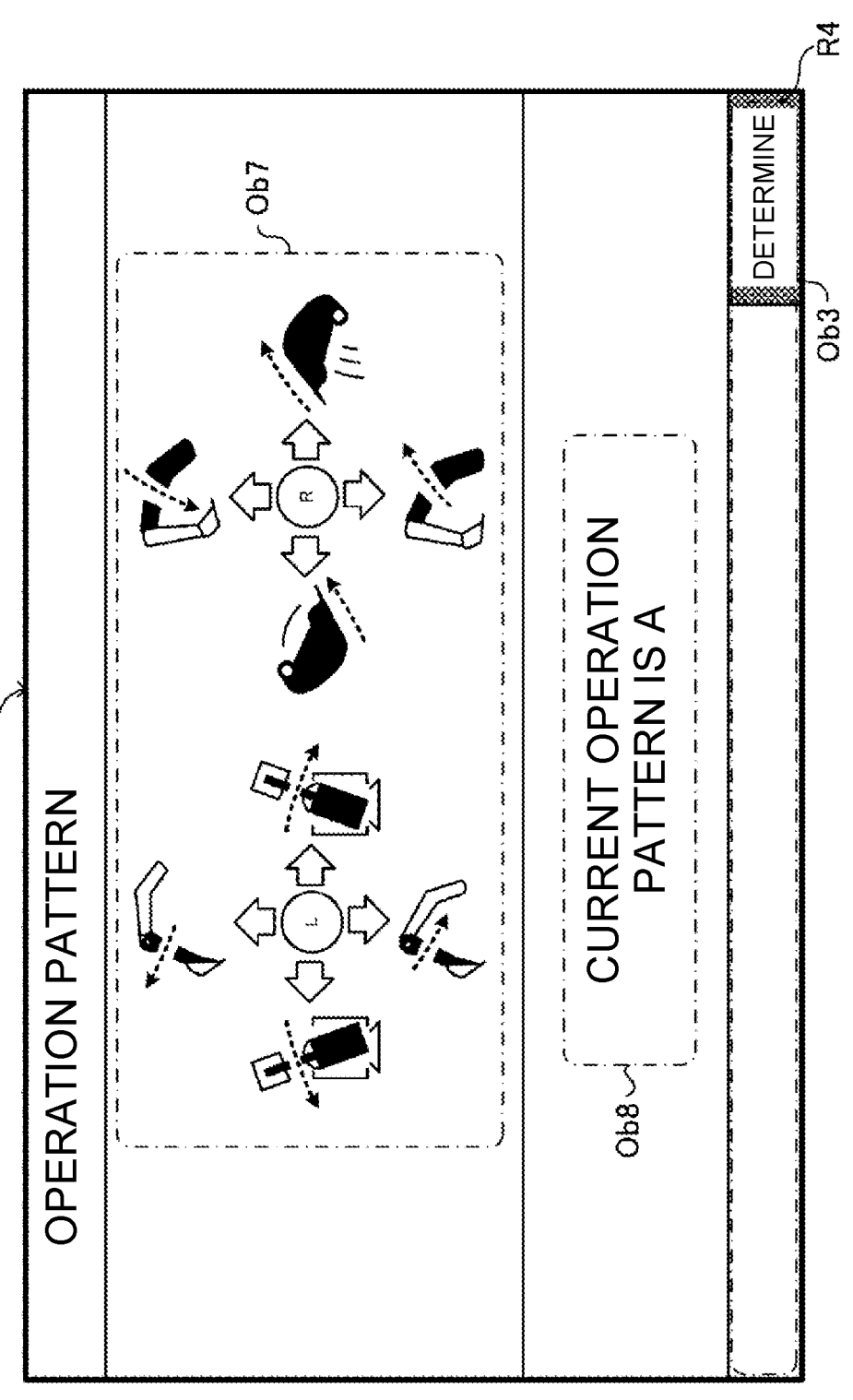
FIG. 14 is a diagram showing an example of a notification screen displayed by the work machine control system according to a second embodiment.

As shown in FIG. 14, a control method according to the present embodiment differs from the control method according to the first embodiment in the mode of displaying the notification screen Dp12. Hereinafter, the same components as those in the first embodiment will be denoted by the same reference signs, and the description thereof will be properly omitted.

In the present embodiment, as shown in FIG. 14, the notification screen Dp12 displays, instead of the pop-up window W1 displayed on the home screen Dp11, the operation pattern information in a larger display size. This notification screen Dp12 includes, as the operation pattern information, a graphic image (icon) Ob7 that shows the correspondence between the operation device 35's operation and the machine body 30's movement. That is, in the present embodiment, the majority of the display screen Dp1 is assigned to the display of the graphic image Ob7, so that, as well as the detailed information on the change screen Dp14, the graphic image Ob7, which shows the combination of the operation direction of each of the pair of operation levers 351, 352 and the machine body 30's movement, is included as the operation pattern information.

Further, the operation pattern information on the notification screen Dp12 corresponds to the notation of the name plate 39 (see FIG. 4) attached to the machine body 30. That is, the graphic image Ob7 in the notification screen Dp12 is, for example, a design same as the graphic image noted on the name plate 39. This allows the operator to grasp the detail of each operation pattern based on a familiar notation similar to that on the name plate 39.

Further, the notification screen Dp12 includes a text Ob8 that shows that "Pattern A" is selected as the operation pattern, as in "Current operation pattern is A". Therefore, displaying the above notification screen Dp12 at the display device 2 makes it possible for the operator to easily check the operation pattern information showing the current operation pattern.

Even the notification screen Dp12 according to the present embodiment is displayed at the time of the switching from the state (inactive state) in which the machine body 30 fails to move according to the operation device 35's operation to the state (active state) in which the machine body 30 moves according to the operation device 35's operation, as in the first embodiment. That is, at the time of the work machine 3's startup and of the cutoff lever 372's operation, etc., the notification screen Dp12 as shown in FIG. 14 is displayed at the display device 2.

The configuration according to the second embodiment can be adopted in proper combination with the various configurations (including the modified example) described in the first embodiment.

Third Embodiment

The control method according to the present embodiment differs from the control method according to the first embodiment in the procedure for calling up (displaying) the change screen Dp14. Hereinafter, the same components as those in the first embodiment will be denoted by the same reference signs, and the description thereof will be properly omitted.

Figure 15:
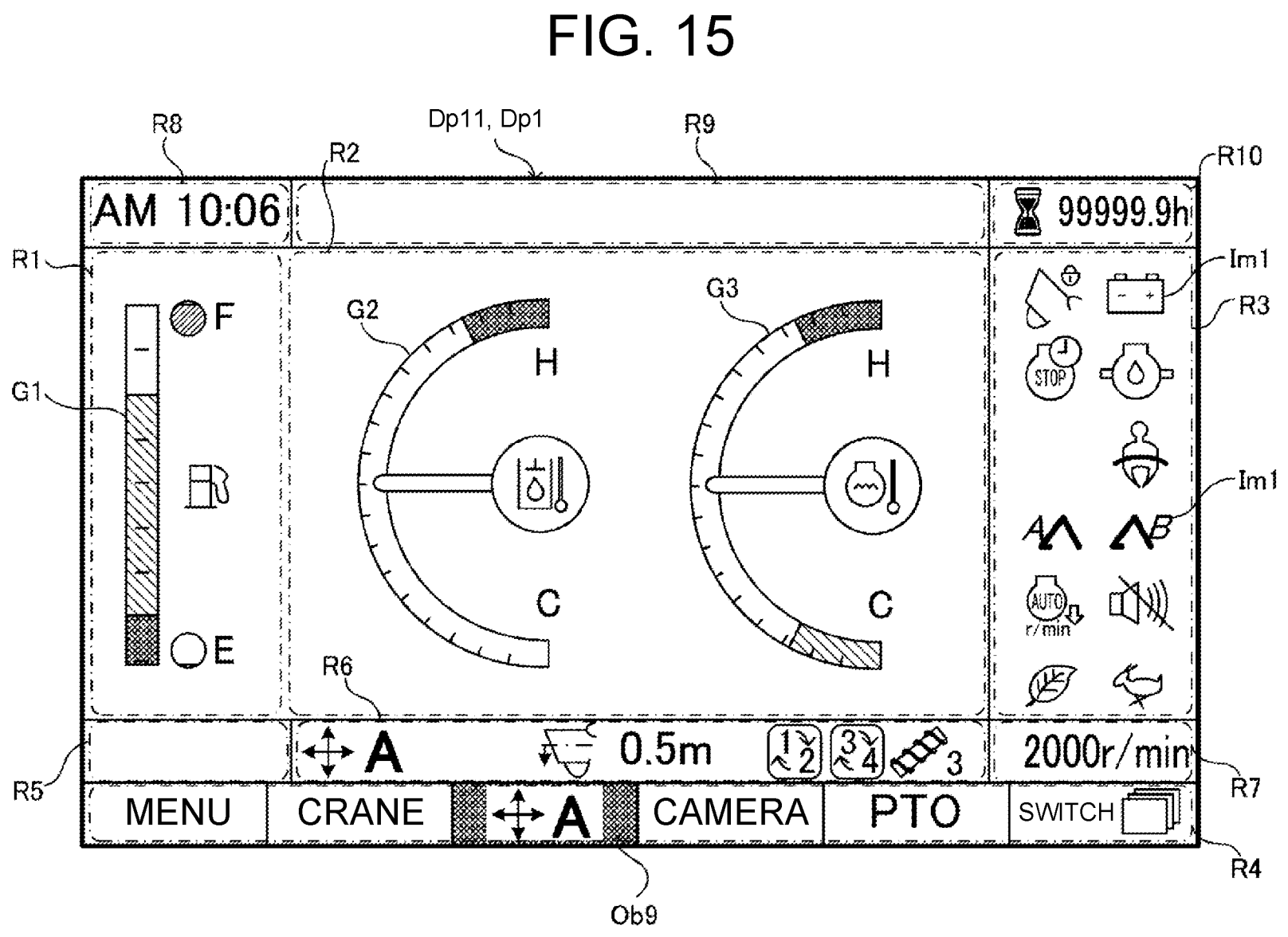

As shown in FIG. 15, in the present embodiment, the home screen Dp11 includes a call up object Ob9 for calling up the change screen Dp14. That is, when the call up object Ob9 is operated (selected) on the home screen Dp11, the presentation processing unit 14 causes the display unit 23 of the display device 2 to display the change screen Dp14 as the display screen Dp1. Thus, in the present embodiment, the home screen Dp11 is a type of a call up screen for calling up the change screen Dp14, and the display screen Dp1 shifts from the home screen Dp11 directly to the change screen Dp14.

In the example in FIG. 15, the call up object Ob9, instead of the item "Mode" in the home screen Dp11 in the first embodiment, is placed in the fourth region R4. Therefore, with the home screen Dp11 being displayed, the user U1 (see FIG. 3), by operating the push button switch 223 that corresponds to the call up object Ob9, operates (selects) the call up object Ob9, thereby to display the change screen Dp14.

Further, the call up object Ob9 includes a mark as the operation pattern information. In the example in FIG. 15, the mark of the call up object Ob9 is a graphic image (icon) with a crossed arrow and a letter "A" showing being the pattern "A". That is, in the example in FIG. 15, the operation pattern information included in the call up object Ob9 of the home screen Dp11 shows that the current operation pattern is the pattern "A" (operation pattern for "ISO, made by company XX, made by company YY"). Therefore, displaying the above call up object Ob9 at the display device 2, at least when calling up the change screen Dp14, presents, to the operator, the operation pattern information showing the current operation pattern.

As described above, in the present embodiment, the change screen Dp14 for changing the operation pattern is called up directly from the home screen Dp11. Therefore, at the time of setting (changing) the operation pattern, the operator can open the change screen Dp14 from the home screen Dp11 in fewer procedures.

The configuration according to the third embodiment can be adopted in proper combination with various configurations (including the modified example) described in the first embodiment or the second embodiment.

REFERENCE SIGNS LIST

1: work machine control system
2: display device
3: work machine
14: presentation processing unit
30: machine body
35: operation device
39: name plate
372: cutoff lever
Dp11: home screen
Dp12: notification screen
Dp14: change screen (specific screen)
Dp16: vehicle body change screen (call up screen)
G1: residual volume information (information on active state of work machine)
G2: hydraulic oil temperature information (information on active state of work machine)
G3: cooling water temperature information (information on active state of work machine)
G4: peripheral image
Im1: graphic image
Ob4: mark (operation pattern information)
Ob5: call up object
Ob6: mark (operation pattern information)
Ob7: graphic image
Ob9: call up object
R2: second region

The invention claimed is:
1. A method of controlling a work machine provided with a machine body that moves according to an operation device's operation and that is capable of changing an operation pattern which is a correspondence between the operation device's operation and the machine body's movement, the method of controlling comprising:
    causing a display device to display a home screen including:
        information on an active state of the work machine and, operation pattern information showing the operation pattern that is current, wherein after the display device is turned on, a notification screen that includes the operation pattern information is displayed in the display device before the home screen.

2. The method of controlling the work machine as claimed in claim 1, wherein on the home screen, the information on the active state of the work machine and the operation pattern information are placed adjacent to each other.

3. The method of controlling the work machine as claimed in claim 1, wherein the home screen further includes a graphic image that shows information on a function of the work machine.

4. The method of controlling the work machine as claimed in claim 3, wherein on the home screen, the graphic image and the operation pattern are so placed as to be spaced apart.

5. The method of controlling the work machine as claimed in claim 1, wherein the home screen's region where at least a part of the information on the active state of the work machine is displayed is capable of displaying a peripheral image of the machine body.

6. The method of controlling the work machine as claimed in claim 5, wherein the operation pattern information is placed around the region of the home screen.

7. The method of controlling the work machine as claimed in claim 1, wherein whether or not to display the operation pattern information in the home screen is determined according to at least one of a specification and type of the work machine.

8. The method of controlling the work machine as claimed in claim 7, wherein when the work machine is free from a function to change the operation pattern, the operation pattern information is not displayed in the home screen.

9. The method of controlling the work machine as claimed in claim 1, wherein the operation pattern information on the home screen corresponds to a notation of a name plate attached to the machine body.

10. A method of controlling a work machine provided with a machine body that moves according to an operation device's operation and that is capable of changing an operation pattern which is a correspondence between the operation device's operation and the machine body's movement, the method of controlling, comprising:

causing the display device to display a change screen for changing the operation pattern, and causing the display device to display a call up screen for calling up the change screen, wherein the call up screen includes operation pattern information showing the current operation pattern, wherein after the display device is turned on, a notification screen that includes the operation pattern information is displayed in the display device before a home screen.

11. The method of controlling the work machine as claimed in claim 10, wherein the call up screen includes a call up object that accepts an operation to call up the change screen, and the operation pattern information is displayed in association with the call up object.

12. The method of controlling the work machine as claimed in claim 10, wherein the change screen includes changed pattern information showing the operation pattern after the changing.

13. The method of controlling the work machine as claimed in claim 12, wherein the changed pattern information on the change screen corresponds to a notation of a name plate attached to the machine body.

14. The method of controlling the work machine as claimed in claim 10, wherein in a state in which the machine body moves according to the operation device's operation, the display device is caused to display the home screen, and a display screen displayed at the display device shifts from the home screen via the call up screen, which is different from the home screen, to the change screen.

15. The method of controlling the work machine as claimed in claim 10, wherein the operation pattern is changeable only in the state in which the machine body fails to move according to the operation device's operation, out of the state in which the machine body fails to move according to the operation device's operation and the state in which the machine body moves according to the operation device's operation.

16. The method of controlling the work machine as claimed in claim 15, wherein switching between the state in which the machine body fails to move according to the operation device's operation and the state in which the machine body moves according to the operation device's operation is performed at least according to a cutoff lever's operation.

17. A method of controlling a work machine provided with a machine body that moves according to an operation device's operation and that is capable of changing an operation pattern which is a correspondence between the operation device's operation and the machine body's movement, the method of controlling, comprising:

presenting the operation pattern information, which shows the current operation pattern, at the time of switching from a state in which the machine body fails to move according to the operation device's operation, and causing a display device to display a home screen, wherein after the display device is turned on, a notification screen that includes the operation pattern information is displayed in the display device before the home screen.

18. The method of controlling the work machine as claimed in claim 17, wherein the display device displays the home screen in a state in which the machine body moves according to the operation device's operation.

19. The method of controlling the work machine as claimed in claim 18, wherein the notification screen is displayed at the display device at the time of shift from a specific screen to the home screen.

20. The method of controlling the work machine as claimed in claim 18, wherein the notification screen, after occurring of a specific event related to an operation, is displayed at the display device before the displaying of the home screen.

21. The method of controlling the work machine as claimed in claim 18, wherein the home screen includes information on the active state of the work machine.

22. The method of controlling the work machine as claimed in claim 18, wherein the home screen includes the operation pattern information.

23. The method of controlling the work machine as claimed in claim 18, wherein the notification screen includes, as the operation pattern information, a graphic image that shows the correspondence between the operation device's operation and the machine body's movement.

24. The method of controlling the work machine as claimed in claim 18, wherein the operation pattern information in the notification screen corresponds to a notation of a name plate attached to the machine body.

* * * * *